United States Patent
Holzer et al.

(10) Patent No.: US 11,202,017 B2
(45) Date of Patent: Dec. 14, 2021

(54) LIVE STYLE TRANSFER ON A MOBILE DEVICE

(71) Applicant: Fyusion, Inc., San Francisco, CA (US)

(72) Inventors: Stefan Johannes Josef Holzer, San Mateo, CA (US); Abhishek Kar, Berkeley, CA (US); Pavel Hanchar, Minsk (BY); Radu Bogdan Rusu, San Francisco, CA (US); Martin Saelzle, San Francisco, CA (US); Shuichi Tsutsumi, Tokyo (JP); Stephen David Miller, San Francisco, CA (US); George Haber, Los Altos Hills, CA (US)

(73) Assignee: Fyusion, Inc., San Francisco, CA (US)

( * ) Notice: Subject to any disclaimer, the term of this patent is extended or adjusted under 35 U.S.C. 154(b) by 953 days.

(21) Appl. No.: 15/717,889

(22) Filed: Sep. 27, 2017

(65) Prior Publication Data

US 2018/0103213 A1 Apr. 12, 2018

Related U.S. Application Data

(60) Provisional application No. 62/405,185, filed on Oct. 6, 2016.

(51) Int. Cl.
*H04N 5/262* (2006.01)
*H04N 5/232* (2006.01)
(Continued)

(52) U.S. Cl.
CPC ............ *H04N 5/2621* (2013.01); *G06N 3/02* (2013.01); *G06N 3/04* (2013.01); *G06N 3/0454* (2013.01);
(Continued)

(58) Field of Classification Search
CPC .......... H04N 5/2621; H04N 5/232935; G06N 3/0454; G06N 3/02
See application file for complete search history.

(56) References Cited

U.S. PATENT DOCUMENTS

| 2,534,821 A | 12/1950 | Richard |
| 5,495,576 A | 2/1996 | Ritchey |

(Continued)

FOREIGN PATENT DOCUMENTS

| CN | 105849781 A | 8/2016 |
| CN | 105849781 B | 8/2016 |

(Continued)

OTHER PUBLICATIONS

Chan et al., "An Object-Based Approach to Image/Video-Based Synthesis and Processing for 3-D and Multiview Televisions", 2009, IEEE Transactions on Circuits and Systems for Video Tech, vol. 19, No. 6, pp. 821-831. (Year: 2009).*

(Continued)

*Primary Examiner* — Alexey Shmatov
*Assistant Examiner* — Clint Mullinax
(74) *Attorney, Agent, or Firm* — Kwan & Olynick LLP

(57) ABSTRACT

Various embodiments of the present invention relate generally to systems and processes for transforming a style of video data. In one embodiment, a neural network is used to interpolate native video data received from a camera system on a mobile device in real-time. The interpolation converts the live native video data into a particular style. For example, the style can be associated with a particular artist or a particular theme. The stylized video data can viewed on a display of the mobile device in a manner similar to which native live video data is output to the display. Thus, the stylized video data, which is viewed on the display, is (Continued)

consistent with a current position and orientation of the camera system on the display.

14 Claims, 10 Drawing Sheets

(51) Int. Cl.
  *H04L 29/06* (2006.01)
  *G06N 3/08* (2006.01)
  *G06N 3/04* (2006.01)
  *H04N 5/92* (2006.01)
  *H04N 5/77* (2006.01)
  *H04N 9/82* (2006.01)
  *G06N 3/02* (2006.01)

(52) U.S. Cl.
  CPC ............ *G06N 3/08* (2013.01); *H04L 65/601* (2013.01); *H04N 5/232935* (2018.08); *H04N 5/2628* (2013.01); *H04N 5/77* (2013.01); *H04N 5/9201* (2013.01); *H04N 9/8227* (2013.01)

(56) References Cited

U.S. PATENT DOCUMENTS

| | | | |
|---|---|---|---|
| 5,557,684 A | 9/1996 | Wang | |
| 5,613,048 A | 3/1997 | Chen | |
| 5,613,056 A | 3/1997 | Gasper | |
| 5,706,417 A | 1/1998 | Adelson | |
| 5,847,714 A | 12/1998 | Naqvi | |
| 5,850,352 A | 12/1998 | Moezzi | |
| 5,926,190 A | 7/1999 | Turkowski et al. | |
| 6,031,564 A | 2/2000 | Ma | |
| 6,080,063 A | 6/2000 | Khosla | |
| 6,185,343 B1 | 2/2001 | Ikeda | |
| 6,252,974 B1 | 6/2001 | Martens et al. | |
| 6,266,068 B1 | 7/2001 | Kang | |
| 6,281,903 B1 | 8/2001 | Martin | |
| 6,327,381 B1 | 12/2001 | Rogina | |
| 6,385,245 B1 | 5/2002 | De Haan | |
| 6,504,569 B1 | 1/2003 | Jasinschi | |
| 6,522,787 B1 | 2/2003 | Kumar | |
| 6,778,207 B1 | 8/2004 | Lee | |
| 6,814,889 B1 | 11/2004 | O'Grady | |
| 6,975,756 B1 | 12/2005 | Slabaugh | |
| 7,167,180 B1 | 1/2007 | Shibolet | |
| 7,593,000 B1 | 9/2009 | Chin | |
| 7,631,261 B2 | 12/2009 | Williams | |
| 7,631,277 B1 | 12/2009 | Nie | |
| 8,078,004 B2 | 12/2011 | Kang et al. | |
| 8,094,928 B2 | 1/2012 | Graepel | |
| 8,160,391 B1 | 4/2012 | Zhu | |
| 8,244,069 B1 | 8/2012 | Bourdev | |
| 8,401,276 B1 | 3/2013 | Choe | |
| 8,503,826 B2 | 8/2013 | Klimenko | |
| 8,504,842 B1 | 8/2013 | Meacham | |
| 8,589,069 B1 | 11/2013 | Lehman | |
| 8,682,097 B2 | 3/2014 | Steinberg | |
| 8,803,912 B1 | 8/2014 | Fouts | |
| 8,817,071 B2 | 8/2014 | Wang | |
| 8,819,525 B1 | 8/2014 | Holmer | |
| 8,866,841 B1 | 10/2014 | Distler | |
| 8,947,452 B1 | 2/2015 | Ballagh | |
| 8,947,455 B2 | 2/2015 | Friesen | |
| 8,963,855 B2 | 2/2015 | Chen | |
| 8,966,356 B1 | 2/2015 | Hickman | |
| 9,024,970 B2 | 5/2015 | Lynch | |
| 9,027,117 B2 | 5/2015 | Wilairat | |
| 9,043,222 B1 | 5/2015 | Kerr | |
| 9,070,402 B2 | 6/2015 | Burtnyk | |
| 9,094,670 B1 | 7/2015 | Furio | |
| 9,129,179 B1 | 9/2015 | Wong | |
| 9,317,881 B1 | 4/2016 | Ledterman | |
| 9,325,899 B1 | 4/2016 | Chou | |
| 9,367,951 B1 | 6/2016 | Gray | |
| 9,390,250 B2 | 7/2016 | Kim | |
| 9,400,595 B2 | 7/2016 | Li | |
| 9,407,816 B1 | 8/2016 | Sehn | |
| 9,412,203 B1 | 8/2016 | Garcia, III et al. | |
| 9,472,161 B1 | 10/2016 | Ho | |
| 9,621,768 B1 | 4/2017 | Lyon | |
| 9,704,257 B1 | 7/2017 | Tuzel | |
| 9,734,586 B2 | 8/2017 | Luo | |
| 9,865,033 B1 | 1/2018 | Jafarzadeh | |
| 9,865,058 B2 | 1/2018 | Mullins | |
| 9,865,069 B1 | 1/2018 | Saporta | |
| 9,898,742 B2 | 2/2018 | Higgins | |
| 9,904,056 B2 | 2/2018 | Raghoebardajal | |
| 9,910,505 B2 | 3/2018 | Park | |
| 9,940,541 B2 | 4/2018 | Holzer | |
| 9,998,663 B1 | 6/2018 | François | |
| 10,055,882 B2 | 8/2018 | Marin | |
| 10,147,211 B2 | 12/2018 | Holzer | |
| 10,157,333 B1 * | 12/2018 | Wang | G06N 3/04 |
| 10,176,592 B2 | 1/2019 | Holzer | |
| 10,176,636 B1 | 1/2019 | Neustein | |
| 10,204,448 B2 | 2/2019 | Hazeghi | |
| 10,222,932 B2 | 3/2019 | Holzer | |
| 10,242,474 B2 | 3/2019 | Holzer | |
| 10,262,426 B2 | 4/2019 | Holzer | |
| 10,275,935 B2 | 4/2019 | Holzer | |
| 10,284,794 B1 | 5/2019 | Francois | |
| 10,373,260 B1 | 8/2019 | Haller, Jr. | |
| 10,430,995 B2 | 10/2019 | Holzer | |
| 10,574,974 B2 | 2/2020 | Arora | |
| 10,719,939 B2 | 7/2020 | Holzer | |
| 10,725,609 B2 | 7/2020 | Holzer | |
| 10,726,560 B2 | 7/2020 | Holzer | |
| 10,748,313 B2 | 8/2020 | Holzer | |
| 10,750,161 B2 | 8/2020 | Holzer | |
| 10,818,029 B2 | 10/2020 | Holzer | |
| 10,846,913 B2 | 11/2020 | Holzer | |
| 10,852,902 B2 | 12/2020 | Holzer | |
| 11,006,095 B2 | 5/2021 | Holzer | |
| 2001/0014172 A1 | 8/2001 | Baba | |
| 2002/0024517 A1 | 2/2002 | Yamaguchi | |
| 2002/0094125 A1 | 7/2002 | Guo | |
| 2002/0190991 A1 | 12/2002 | Efran | |
| 2003/0086002 A1 | 5/2003 | Cahill | |
| 2003/0185456 A1 | 10/2003 | Sato | |
| 2003/0231179 A1 | 12/2003 | Suzuki | |
| 2004/0085335 A1 | 5/2004 | Burlnyk | |
| 2004/0104935 A1 | 6/2004 | Williamson | |
| 2004/0141014 A1 | 7/2004 | Kamiwada et al. | |
| 2004/0184013 A1 | 9/2004 | Raskar | |
| 2004/0222987 A1 | 11/2004 | Chang | |
| 2004/0239699 A1 | 12/2004 | Uyttendaele | |
| 2005/0018045 A1 | 1/2005 | Thomas | |
| 2005/0041842 A1 | 2/2005 | Frakes | |
| 2005/0046645 A1 | 3/2005 | Breton | |
| 2005/0119550 A1 | 6/2005 | Serra | |
| 2005/0151759 A1 | 7/2005 | Gonzalez-Banos | |
| 2005/0186548 A1 | 8/2005 | Tomlinson | |
| 2005/0219264 A1 | 10/2005 | Shum | |
| 2005/0226502 A1 | 10/2005 | Cohen et al. | |
| 2005/0232467 A1 | 10/2005 | Mohri | |
| 2005/0232510 A1 | 10/2005 | Blake | |
| 2005/0283075 A1 | 12/2005 | Ma | |
| 2005/0285874 A1 | 12/2005 | Zitnick, III | |
| 2006/0028552 A1 | 2/2006 | Aggarwal | |
| 2006/0188147 A1 | 8/2006 | Rai et al. | |
| 2006/0193535 A1 | 8/2006 | Mishima | |
| 2006/0250505 A1 | 11/2006 | Gennetten et al. | |
| 2006/0256109 A1 | 11/2006 | Acker | |
| 2007/0008312 A1 | 1/2007 | Zhou | |
| 2007/0058880 A1 | 3/2007 | Lienard | |
| 2007/0064802 A1 | 3/2007 | Paniconi | |
| 2007/0070069 A1 | 3/2007 | Samarasekera | |
| 2007/0110338 A1 | 5/2007 | Snavely | |
| 2007/0118801 A1 | 5/2007 | Harshbarger | |
| 2007/0126928 A1 | 6/2007 | Klompnhouwer | |
| 2007/0159487 A1 | 7/2007 | Felt | |

(56) References Cited

U.S. PATENT DOCUMENTS

| | | |
|---|---|---|
| 2007/0237420 A1 | 10/2007 | Steedly |
| 2007/0237422 A1 | 10/2007 | Zhou |
| 2007/0252804 A1 | 11/2007 | Engel |
| 2008/0025588 A1 | 1/2008 | Zhang |
| 2008/0033641 A1 | 2/2008 | Medalia |
| 2008/0106593 A1 | 5/2008 | Arfvidsson |
| 2008/0151106 A1 | 6/2008 | Verburgh |
| 2008/0152258 A1 | 6/2008 | Tulkki |
| 2008/0198159 A1 | 8/2008 | Liu |
| 2008/0201734 A1 | 8/2008 | Lyon et al. |
| 2008/0225132 A1 | 9/2008 | Inaguma |
| 2008/0246759 A1 | 10/2008 | Summers |
| 2008/0266142 A1 | 10/2008 | Sula |
| 2008/0278569 A1 | 11/2008 | Rotem |
| 2008/0313014 A1 | 12/2008 | Fell |
| 2009/0003725 A1 | 1/2009 | Merkel |
| 2009/0046160 A1 | 2/2009 | Hayashi |
| 2009/0077161 A1 | 3/2009 | Hamilton, II |
| 2009/0087029 A1 | 4/2009 | Coleman |
| 2009/0116732 A1 | 5/2009 | Zhou |
| 2009/0141130 A1 | 6/2009 | Ortiz |
| 2009/0144173 A1 | 6/2009 | Mo |
| 2009/0153549 A1 | 6/2009 | Lynch |
| 2009/0160934 A1 | 6/2009 | Hendrickson |
| 2009/0163185 A1 | 6/2009 | Lim |
| 2009/0174709 A1 | 7/2009 | Kozlak |
| 2009/0208062 A1 | 8/2009 | Sorek |
| 2009/0262074 A1 | 10/2009 | Nasiri |
| 2009/0263045 A1 | 10/2009 | Szeliski et al. |
| 2009/0274391 A1 | 11/2009 | Arcas |
| 2009/0276805 A1 | 11/2009 | Andrews Ii |
| 2009/0303343 A1 | 12/2009 | Drimbarean |
| 2010/0007715 A1 | 1/2010 | Lai |
| 2010/0017181 A1 | 1/2010 | Mouton |
| 2010/0026788 A1 | 2/2010 | Ishikawa |
| 2010/0033553 A1 | 2/2010 | Levy |
| 2010/0060793 A1 | 3/2010 | Oz |
| 2010/0079667 A1 | 4/2010 | Tueretken |
| 2010/0098258 A1 | 4/2010 | Thorn |
| 2010/0100492 A1 | 4/2010 | Law |
| 2010/0110069 A1 | 5/2010 | Yuan |
| 2010/0164990 A1 | 7/2010 | Van Doorn |
| 2010/0171691 A1 | 7/2010 | Cook et al. |
| 2010/0188584 A1 | 7/2010 | Liu |
| 2010/0215251 A1 | 8/2010 | Klein |
| 2010/0225743 A1 | 9/2010 | Florencio |
| 2010/0231593 A1 | 9/2010 | Zhou |
| 2010/0259595 A1 | 10/2010 | Trimeche |
| 2010/0266172 A1 | 10/2010 | Shlomi |
| 2010/0305857 A1 | 12/2010 | Byrne |
| 2010/0315412 A1 | 12/2010 | Sinha et al. |
| 2010/0329542 A1 | 12/2010 | Ramalingam |
| 2011/0007072 A1 | 1/2011 | Khan et al. |
| 2011/0033170 A1 | 2/2011 | Ikeda |
| 2011/0034103 A1 | 2/2011 | Fong |
| 2011/0040539 A1 | 2/2011 | Szymczyk |
| 2011/0043604 A1 | 2/2011 | Peleg |
| 2011/0064388 A1 | 3/2011 | Brown |
| 2011/0090344 A1 | 4/2011 | Gefen |
| 2011/0105192 A1 | 5/2011 | Jung |
| 2011/0109618 A1 | 5/2011 | Nowak |
| 2011/0109726 A1 | 5/2011 | Hwang |
| 2011/0115886 A1 | 5/2011 | Nguyen |
| 2011/0141141 A1 | 6/2011 | Kankainen |
| 2011/0141227 A1 | 6/2011 | Bigioi |
| 2011/0142289 A1 | 6/2011 | Barenbrug |
| 2011/0142343 A1 | 6/2011 | Kim |
| 2011/0170789 A1 | 7/2011 | Amon |
| 2011/0173565 A1 | 7/2011 | Ofek |
| 2011/0179373 A1 | 7/2011 | Moore |
| 2011/0193941 A1 | 8/2011 | Inaba et al. |
| 2011/0214072 A1 | 9/2011 | Lindemann |
| 2011/0234750 A1 | 9/2011 | Lai |
| 2011/0248987 A1 | 10/2011 | Mitchell |
| 2011/0254835 A1 | 10/2011 | Segal |
| 2011/0261050 A1 | 10/2011 | Smolic et al. |
| 2011/0288858 A1 | 11/2011 | Gay |
| 2011/0313653 A1 | 12/2011 | Lindner |
| 2011/0316963 A1 | 12/2011 | Li |
| 2012/0007713 A1 | 1/2012 | Nasiri |
| 2012/0013711 A1 | 1/2012 | Tamir |
| 2012/0017147 A1 | 1/2012 | Mark |
| 2012/0019557 A1 | 1/2012 | Aronsson et al. |
| 2012/0028706 A1 | 2/2012 | Raitt |
| 2012/0041722 A1 | 2/2012 | Quan |
| 2012/0057006 A1 | 3/2012 | Joseph |
| 2012/0062756 A1 | 3/2012 | Tian |
| 2012/0075411 A1 | 3/2012 | Matsumoto |
| 2012/0092348 A1 | 4/2012 | McCutchen |
| 2012/0099804 A1 | 4/2012 | Aguilera |
| 2012/0127172 A1 | 5/2012 | Wu |
| 2012/0127270 A1 | 5/2012 | Zhang |
| 2012/0139918 A1 | 6/2012 | Michail |
| 2012/0147224 A1 | 6/2012 | Takayama |
| 2012/0148162 A1 | 6/2012 | Zhang et al. |
| 2012/0162223 A1 | 6/2012 | Hirai |
| 2012/0162253 A1 | 6/2012 | Collins |
| 2012/0167146 A1 | 6/2012 | Incorvia |
| 2012/0198317 A1 | 8/2012 | Eppolito |
| 2012/0207308 A1 | 8/2012 | Sung |
| 2012/0212579 A1 | 8/2012 | Froejdh |
| 2012/0236201 A1 | 9/2012 | Larsen |
| 2012/0240035 A1 | 9/2012 | Gaucas |
| 2012/0257025 A1 | 10/2012 | Kim |
| 2012/0257065 A1 | 10/2012 | Velarde |
| 2012/0258436 A1 | 10/2012 | Lee |
| 2012/0262580 A1 | 10/2012 | Huebner |
| 2012/0293632 A1 | 11/2012 | Yukich |
| 2012/0294549 A1 | 11/2012 | Doepke |
| 2012/0300019 A1 | 11/2012 | Yang |
| 2012/0301044 A1 | 11/2012 | Nakada |
| 2012/0314040 A1 | 12/2012 | Kopf |
| 2012/0314899 A1 | 12/2012 | Cohen |
| 2013/0002649 A1 | 1/2013 | Wu |
| 2013/0016102 A1 | 1/2013 | Look |
| 2013/0016897 A1 | 1/2013 | Cho |
| 2013/0018881 A1 | 1/2013 | Bhatt |
| 2013/0044191 A1 | 2/2013 | Matsumoto |
| 2013/0050573 A1 | 2/2013 | Syed |
| 2013/0057644 A1 | 3/2013 | Stefanoski |
| 2013/0063549 A1 | 3/2013 | Schnyder |
| 2013/0071012 A1 | 3/2013 | Leichsenring |
| 2013/0076619 A1 | 3/2013 | Carr |
| 2013/0113830 A1 | 5/2013 | Suzuki |
| 2013/0120581 A1 | 5/2013 | Daniels |
| 2013/0127844 A1 | 5/2013 | Koeppel |
| 2013/0127847 A1 | 5/2013 | Jin |
| 2013/0129304 A1 | 5/2013 | Feinson |
| 2013/0141530 A1 | 6/2013 | Zavesky |
| 2013/0147795 A1 | 6/2013 | Kim |
| 2013/0147905 A1 | 6/2013 | Vivekanandan |
| 2013/0154926 A1 | 6/2013 | Kim |
| 2013/0155180 A1 | 6/2013 | Wantland et al. |
| 2013/0162634 A1 | 6/2013 | Baik |
| 2013/0162787 A1 | 6/2013 | Cho |
| 2013/0176392 A1 | 7/2013 | Carr |
| 2013/0195350 A1 | 8/2013 | Tanaka |
| 2013/0204411 A1 | 8/2013 | Clark |
| 2013/0208900 A1 | 8/2013 | Vincent |
| 2013/0212538 A1 | 8/2013 | Lemire |
| 2013/0219357 A1 | 8/2013 | Reitan |
| 2013/0240628 A1* | 9/2013 | van der Merwe ... G06K 7/1447 235/462.24 |
| 2013/0250045 A1 | 9/2013 | Ki et al. |
| 2013/0271566 A1 | 10/2013 | Chen |
| 2013/0278596 A1 | 10/2013 | Wu |
| 2013/0314442 A1 | 11/2013 | Langlotz et al. |
| 2014/0002440 A1 | 1/2014 | Lynch |
| 2014/0002472 A1 | 1/2014 | Sobeski |
| 2014/0009462 A1 | 1/2014 | McNamer |
| 2014/0013414 A1 | 1/2014 | Bruck |
| 2014/0023341 A1 | 1/2014 | Wang |
| 2014/0037198 A1 | 2/2014 | Larlus-Larrondo |
| 2014/0040742 A1 | 2/2014 | Park |

(56) References Cited

U.S. PATENT DOCUMENTS

| | | |
|---|---|---|
| 2014/0049607 A1 | 2/2014 | Amon |
| 2014/0059674 A1 | 2/2014 | Sun |
| 2014/0063005 A1 | 3/2014 | Ahn |
| 2014/0078136 A1 | 3/2014 | Sohn |
| 2014/0087877 A1 | 3/2014 | Krishnan |
| 2014/0092259 A1 | 4/2014 | Tsang |
| 2014/0100995 A1 | 4/2014 | Koshy |
| 2014/0107888 A1 | 4/2014 | Quast |
| 2014/0118479 A1 | 5/2014 | Rapoport |
| 2014/0118483 A1 | 5/2014 | Rapoport |
| 2014/0118494 A1 | 5/2014 | Wu |
| 2014/0125659 A1 | 5/2014 | Yoshida |
| 2014/0132594 A1 | 5/2014 | Gharpure |
| 2014/0152834 A1 | 6/2014 | Kosseifi |
| 2014/0153832 A1 | 6/2014 | Kwatra |
| 2014/0177927 A1 | 6/2014 | Shieh |
| 2014/0192155 A1 | 7/2014 | Choi |
| 2014/0198184 A1 | 7/2014 | Stein |
| 2014/0199050 A1 | 7/2014 | Khalsa |
| 2014/0211989 A1 | 7/2014 | Ding |
| 2014/0225930 A1 | 8/2014 | Durmek |
| 2014/0232634 A1 | 8/2014 | Piemonte |
| 2014/0253436 A1 | 9/2014 | Petersen |
| 2014/0253746 A1 | 9/2014 | Voss |
| 2014/0267616 A1 | 9/2014 | Krig |
| 2014/0275704 A1 | 9/2014 | Zhang |
| 2014/0286566 A1 | 9/2014 | Rhoads |
| 2014/0293004 A1 | 10/2014 | Tsubaki |
| 2014/0293028 A1 | 10/2014 | Nguyen |
| 2014/0297798 A1 | 10/2014 | Bakalash |
| 2014/0307045 A1 | 10/2014 | Richardt et al. |
| 2014/0340404 A1 | 11/2014 | Wang |
| 2014/0362198 A1 | 12/2014 | Nakayama |
| 2014/0365888 A1 | 12/2014 | Curzon |
| 2014/0375684 A1 | 12/2014 | Algreatly |
| 2015/0009130 A1 | 1/2015 | Motta |
| 2015/0010218 A1 | 1/2015 | Bayer |
| 2015/0016714 A1 | 1/2015 | Chui |
| 2015/0042812 A1 | 2/2015 | Tang |
| 2015/0046875 A1 | 2/2015 | Xu |
| 2015/0073570 A1 | 3/2015 | Gonzalez-Mendoza |
| 2015/0078449 A1 | 3/2015 | Diggins |
| 2015/0097961 A1 | 4/2015 | Ure |
| 2015/0103170 A1 | 4/2015 | Nelson |
| 2015/0103197 A1 | 4/2015 | Djordjevic |
| 2015/0130799 A1 | 5/2015 | Holzer et al. |
| 2015/0130800 A1 | 5/2015 | Holzer et al. |
| 2015/0130894 A1 | 5/2015 | Holzer et al. |
| 2015/0134651 A1 | 5/2015 | Holzer et al. |
| 2015/0138190 A1 | 5/2015 | Holzer et al. |
| 2015/0143239 A1 | 5/2015 | Birkbeck |
| 2015/0188967 A1 | 7/2015 | Paulauskas |
| 2015/0193963 A1 | 7/2015 | Chen |
| 2015/0198443 A1 | 7/2015 | Yi |
| 2015/0222880 A1 | 8/2015 | Choi |
| 2015/0227285 A1 | 8/2015 | Lee |
| 2015/0227816 A1 | 8/2015 | Du et al. |
| 2015/0235408 A1 | 8/2015 | Gross |
| 2015/0242686 A1 | 8/2015 | Lenka |
| 2015/0269772 A1 | 9/2015 | Ha |
| 2015/0271356 A1 | 9/2015 | Terada |
| 2015/0281323 A1 | 10/2015 | Gold |
| 2015/0294492 A1 | 10/2015 | Koch |
| 2015/0309695 A1 | 10/2015 | Sannandeji |
| 2015/0318020 A1* | 11/2015 | Pribula ............... H04N 9/8205 386/227 |
| 2015/0319424 A1 | 11/2015 | Haimovitch-Yogev |
| 2015/0324649 A1 | 11/2015 | Grewe |
| 2015/0339846 A1 | 11/2015 | Holzer et al. |
| 2015/0371440 A1 | 12/2015 | Pirchheim |
| 2015/0379763 A1 | 12/2015 | Liktor |
| 2016/0001137 A1 | 1/2016 | Phillips |
| 2016/0026253 A1 | 1/2016 | Bradski |
| 2016/0027209 A1 | 1/2016 | Demirli |
| 2016/0034459 A1 | 2/2016 | Larsen |
| 2016/0042251 A1 | 2/2016 | Cordova-Diba |
| 2016/0044240 A1 | 2/2016 | Beers |
| 2016/0050368 A1 | 2/2016 | Seo et al. |
| 2016/0055330 A1 | 2/2016 | Morishita |
| 2016/0061582 A1 | 3/2016 | Lucey |
| 2016/0063740 A1 | 3/2016 | Sakimoto |
| 2016/0077422 A1 | 3/2016 | Wang |
| 2016/0078287 A1 | 3/2016 | Auge |
| 2016/0080684 A1 | 3/2016 | Farrell |
| 2016/0080830 A1 | 3/2016 | Kim |
| 2016/0086381 A1 | 3/2016 | Jung |
| 2016/0110913 A1 | 4/2016 | Kosoy |
| 2016/0139794 A1 | 5/2016 | Hammendorp |
| 2016/0140125 A1 | 5/2016 | Goyal |
| 2016/0171330 A1 | 6/2016 | Mentese |
| 2016/0189334 A1 | 6/2016 | Mason |
| 2016/0191895 A1 | 6/2016 | Yun |
| 2016/0203586 A1 | 7/2016 | Chang |
| 2016/0205341 A1 | 7/2016 | Hollander |
| 2016/0210602 A1 | 7/2016 | Siddique |
| 2016/0261855 A1 | 9/2016 | Park |
| 2016/0267676 A1 | 9/2016 | Setomoto |
| 2016/0275283 A1 | 9/2016 | De Leon |
| 2016/0295127 A1 | 10/2016 | Yu |
| 2016/0350930 A1 | 12/2016 | Lin |
| 2016/0350975 A1 | 12/2016 | Nakagawa |
| 2016/0353089 A1 | 12/2016 | Gallup |
| 2016/0358337 A1 | 12/2016 | Dai |
| 2016/0379415 A1 | 12/2016 | Espeset |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0024094 A1 | 1/2017 | Gresham |
| 2017/0026574 A1 | 1/2017 | Kwon |
| 2017/0053169 A1 | 2/2017 | Cuban |
| 2017/0084001 A1 | 3/2017 | Holzer et al. |
| 2017/0084293 A1 | 3/2017 | Holzer |
| 2017/0087415 A1 | 3/2017 | Nandimandalam |
| 2017/0103510 A1 | 4/2017 | Wang |
| 2017/0103584 A1 | 4/2017 | Vats |
| 2017/0109930 A1 | 4/2017 | Holzer |
| 2017/0124769 A1 | 5/2017 | Saito |
| 2017/0124770 A1 | 5/2017 | Vats |
| 2017/0126988 A1 | 5/2017 | Holzer |
| 2017/0140236 A1 | 5/2017 | Price |
| 2017/0148179 A1 | 5/2017 | Holzer |
| 2017/0148186 A1 | 5/2017 | Holzer |
| 2017/0148199 A1 | 5/2017 | Holzer |
| 2017/0148222 A1 | 5/2017 | Holzer et al. |
| 2017/0148223 A1 | 5/2017 | Holzer |
| 2017/0158131 A1 | 6/2017 | Friebe |
| 2017/0206648 A1 | 7/2017 | Marra |
| 2017/0213385 A1 | 7/2017 | Yu |
| 2017/0231550 A1 | 8/2017 | Do |
| 2017/0236287 A1 | 8/2017 | Shen |
| 2017/0249339 A1 | 8/2017 | Lester |
| 2017/0256066 A1 | 9/2017 | Richard |
| 2017/0277363 A1 | 9/2017 | Holzer |
| 2017/0278544 A1 | 9/2017 | Choi |
| 2017/0287137 A1 | 10/2017 | Lin |
| 2017/0330319 A1 | 11/2017 | Xu |
| 2017/0337693 A1* | 11/2017 | Baruch .................. G06T 7/194 |
| 2017/0344223 A1 | 11/2017 | Holzer |
| 2017/0344808 A1 | 11/2017 | El-Khamy |
| 2017/0357910 A1* | 12/2017 | Sommer ................ G06F 9/54 |
| 2017/0359570 A1 | 12/2017 | Holzer |
| 2017/0364766 A1 | 12/2017 | Das |
| 2018/0012330 A1 | 1/2018 | Holzer |
| 2018/0012529 A1 | 1/2018 | Chiba |
| 2018/0035105 A1 | 2/2018 | Choi |
| 2018/0035500 A1 | 2/2018 | Song |
| 2018/0045592 A1 | 2/2018 | Okita |
| 2018/0046356 A1 | 2/2018 | Holzer |
| 2018/0046357 A1 | 2/2018 | Holzer |
| 2018/0046649 A1 | 2/2018 | Dal Mutto |
| 2018/0052665 A1 | 2/2018 | Kaur |
| 2018/0063504 A1 | 3/2018 | Haines |
| 2018/0082715 A1* | 3/2018 | Rymkowski ....... G06K 9/00718 |
| 2018/0143023 A1 | 5/2018 | Bjorke |

(56) References Cited

U.S. PATENT DOCUMENTS

| | | | |
|---|---|---|---|
| 2018/0143756 A1 | 5/2018 | Mildrew |
| 2018/0144547 A1 | 5/2018 | Shakib |
| 2018/0199025 A1 | 7/2018 | Holzer |
| 2018/0203877 A1 | 7/2018 | Holzer |
| 2018/0205941 A1 | 7/2018 | Kopf |
| 2018/0211131 A1 | 7/2018 | Holzer |
| 2018/0211404 A1 | 7/2018 | Zhu |
| 2018/0218235 A1 | 8/2018 | Holzer |
| 2018/0218236 A1 | 8/2018 | Holzer |
| 2018/0234671 A1 | 8/2018 | Yang |
| 2018/0255290 A1 | 9/2018 | Holzer |
| 2018/0286098 A1 | 10/2018 | Lorenzo |
| 2018/0336724 A1 | 11/2018 | Spring |
| 2018/0336737 A1 | 11/2018 | Varady |
| 2018/0338126 A1 | 11/2018 | Trevor |
| 2018/0374273 A1 | 12/2018 | Holzer |
| 2019/0019056 A1 | 1/2019 | Pierce |
| 2019/0025544 A1 | 1/2019 | Watanabe |
| 2019/0026956 A1 | 1/2019 | Gausebeck |
| 2019/0035149 A1 | 1/2019 | Chen |
| 2019/0050664 A1 | 2/2019 | Yang |
| 2019/0080499 A1 | 3/2019 | Holzer |
| 2019/0094981 A1 | 3/2019 | Bradski |
| 2019/0213392 A1 | 7/2019 | Pan |
| 2019/0220991 A1 | 7/2019 | Holzer |
| 2019/0221021 A1 | 7/2019 | Holzer |
| 2019/0244372 A1 | 8/2019 | Holzer |
| 2019/0251738 A1 | 8/2019 | Holzer |
| 2019/0278434 A1 | 9/2019 | Holzer |
| 2019/0364265 A1 | 11/2019 | Matsunobu |
| 2020/0027263 A1 | 1/2020 | Holzer |
| 2020/0045249 A1 | 2/2020 | Francois |
| 2020/0234397 A1 | 7/2020 | Holzer |
| 2020/0234451 A1 | 7/2020 | Holzer |

FOREIGN PATENT DOCUMENTS

| | | |
|---|---|---|
| DE | 112014005165 T5 | 7/2016 |
| DE | 112017004150 | 6/2019 |
| GB | 2534821 A | 8/2016 |
| WO | 2015073570 A2 | 5/2015 |
| WO | 2017053197 A1 | 3/2017 |
| WO | 2018035500 A1 | 2/2018 |
| WO | 2018052665 A1 | 3/2018 |

OTHER PUBLICATIONS

Gatys et al, "A Neural Algorithm of Artistic Style", Cornell University, arXiv:1508.06576v2, pp. 1-16. (Year: 2015).*

"U.S. Appl. No. 14/800,638, Non Final Office Action dated Jul. 29, 2016", 11 pages.

"U.S. Appl. No. 14/530,669, Final Office Action dated Apr. 20, 2017", 25 pages.

"U.S. Appl. No. 14/530,669, Non Final Office Action dated Jan. 3, 2017", 26 pages.

"U.S. Appl. No. 14/530,671, Non Final Office Action dated Jan. 3, 2017", 32 pages.

"U.S. Appl. No. 14/539,814, Non Final Office Action dated Dec. 30, 2016", 37 pages.

"U.S. Appl. No. 14/539,889, Non Final Office Action dated Oct. 6, 2016", 14 pages.

"U.S. Appl. No. 14/800,638, Final Office Action dated Jan. 20, 2017", 12 pages.

"U.S. Appl. No. 14/800,638, Non Final Office Action dated Jun. 15, 2017", 12 pgs.

"U.S. Appl. No. 14/819,473, Final Office Action dated Apr. 28, 2016", 45 pages.

"U.S. Appl. No. 14/819,473, Non Final Office Action dated Sep. 1, 2016", 36 pages.

"U.S. Appl. No. 14/819,473, Non Final Office dated Oct. 8, 2015", 44 pgs.

"U.S. Appl. No. 15/426,994, Non Final Office Action dated Apr. 19, 2018", 22 pages.

"U.S. Appl. No. 14/800,638, Advisory Action dated May 9, 2017", 5 pgs.

"International Application Serial No. PCT/US2016/042355, Search Report and Written Opinion dated Oct. 19, 2016", 9 pages.

"Int'l Application Serial No. PCT/US2014/065282, Search Report & Written Opinion dated Feb. 23, 2015", 9 pgs.

"United Kingdom Application Serial No. 1609577.0, Office Action dated 06-15-166", 1 pg.

Ballan, Luca et al., "Unstructured Video-Based Rendering: Interactive Exploration of Casually Captured Videos", ACM, ACM Transactions on Graphics (TOG)—Proceedings of ACM SIGGRAPH 2010, vol. 29, Issue 4, Article No. 87, Jul. 30, 2010.

Cao, Xun et al., "Semi-Automatic 2D-to-3D Conversion Using Disparity Propagation", IEEE, IEEE Transactions on Broadcasting, vol. 57, Issue 2, Apr. 19, 2011, pp. 491-499.

Chan, Shing-Chow et al., "An Object-Based Approach to Image/Video-Based Synthesis and Processing for 3-D and Multiview Televisions", IEEE, IEEE Transactions on Circuits and Systems for Video Technology, vol. 19, Issue 6, Mar. 16, 2009, pp. 821-831.

Chen, Shenchang E., "QuickTime VR—An Image-Based Approach to Virtual Environment Navigation", ACM, SIGGRAPH '95 Proceedings of the 22nd annual conference on Computer graphics and interactive techniques, 1995, 29-38.

Clare, Adam, "Reality is a Game; What is Skybox?", retrieved from the Internet <http://www.realityisagame.com/archives/1776/what-is-a-skybox/>, 5.

Figueroa, Nadia et al., "From Sense to Print: Towards Automatic 3D Printing from 3D Sensing Devices", IEEE, 2013 IEEE International Conference on Systems, Man, and Cybernetics (SMC, Oct. 13, 2013.

Golovinskly, Aleksey et al., "Shape-based Recognition of 3D Point Clouds in Urban Environment", IEEE, IEEE 12th International Conference on Computer Vision (ICCV), 2009, 2154-2161.

Gurdan, Tobias et al., "Spatial and Temporal Interpolation of MultiView Image Sequences", Department of Computer Science, Technische Universität at München Ascending Technologies GmbH, Krailing, Germany, Section 2.3, Image Warping and Blending; Retrieved from the Internet <https://vision.in.tum.de/_media/spezial/bib/gurdan-et-al-gcpr-2014.pdf>, 12.

Keller, Maik et al., "Real-Time 3D Reconstruction in Dynamic Scenes Using Point-Based Fusion", IEEE, 2013 International Conference on 3DTV, Jul. 1, 2013.

Kottamasu, V. L. P., "User Interaction of One-Dimensional Panoramic Images for iPod Touch", Thesis, Linkoping University Electronic Press, LIU-IDA-LITH-EX-A--12/071--SE, Dec. 4, 2012.

Mian, Ajmal S. et al., "Three-Dimensional Model-Based Object Recognition and Segmentation in Clutterd Scenes", IEEE Transactions on Pattern Analysis and Machine Intelligence, col. 28, No. 10, Oct. 2006, 1584-1601.

Saito, Hideo et al., "View Interpolation of Multiple Cameras Based on Projective Geometry", Department of Information and Computer Science, Keio University and Presto, Japan Science and Technology Corporation (JST), retrieved from the Internet <http://citeseerx.ist.psu.edu/viewdoc/download?doi=10.1.1.6.5162&rep=rep1&type=pdf>, 6.

Schiller, Ingo et al., "Datastructure for Capturing Dynamic Scenes with a Time-of-Flight Camera", Springer-Verlad, Dyna3D 2009, LNCS 5742, 2009, 42-57.

Seitz, Steven M., "Image-Based Transformation of Viewpoint and Scene Appearance", A Dissertation submitted in partial fulfillment of the requirements for the Degree of Doctor of Philosophy at the University of Wisconsin; retrieved from the Internet <http://homes.cs.washington.edu/~seitz/papers/thesis.pdf>, 1997, 111.

Shade, Jonathan et al., "Layered Depth Images", Proceedings of the 25th Annual Conference on Computer Graphics and Interactive Techniques, ACM, SIGGRAPH, Jul. 24, 1998, pp. 231-242.

Snavely, Noah et al., "Photo Tourism: Exploring Phot Collections in 3D", ACM, ACM Transactions on Graphics (TOG)—Proceeding of ACM SIGGRAPH 2006, vol. 25, Issue 3, Jul. 2006, 835-846.

(56) References Cited

OTHER PUBLICATIONS

Steder, Bastian et al., "Robust On-line Model-based Object Detection from Range Images", International Conference on Intelligent Robots and Systems, pp. 4739-4744, Oct. 15, 2009, 6 pages.
Thyssen, Anthony, "ImageMagick v6 Examples—Color Basics and Channels", Website http://www.imagemagick.org/Usage/color_basics/, Retrieved Dec. 23, 2016, Mar. 9, 2011.
"U.S. Appl. No. 15/409,500, Examiner Interview Summary dated Mar. 5, 2019", 3 pages.
"U.S. Appl. No. 15/409,500, Non Final Office Action dated Dec. 11, 2018", 11 pgs.
"U.S. Appl. No. 15/409,500, Notice of Allowance dated Jun. 3, 2019", 8 pages.
"U.S. Appl. No. 15/601,863, Examiner Interview Summary dated Nov. 21, 2018", 4 pgs.
"U.S. Appl. No. 15/601,863, Non Final Office Action dated Sep. 20, 2018", 23 pages.
"U.S. Appl. No. 15/601,863, Notice of Allowance dated Jan. 24, 2019", 8 pages.
"International Application Serial No. PCT/US16/52192, Intl Search Report and Written Opinion dated Dec. 12, 2016", 8 pages.
"Intl Application Serial No. PCT/US16/52192, Intl Preliminary Report on Patentability dated Apr. 5, 2018", 7 pgs.
U.S. Appl. No. 14/860,983, Final Rejection, dated Feb. 12, 2020, 18 pgs.
U.S. Appl. No. 15/620,506, Notice of Allowance and Fees Due (Ptol-85), dated Mar. 2, 2020, 10 pgs.
U.S. Appl. No. 15/632,709, Non-Final Rejection, dated May 22, 2020, 10 pgs.
U.S. Appl. No. 15/673,125, Final Rejection, dated Feb. 19, 2020, 17 pgs.
U.S. Appl. No. 15/713,406, Final Rejection, dated Feb. 19, 2020, 22 pgs.
U.S. Appl. No. 15/717,889, Non-Final Rejection, dated Oct. 27, 2020, 40 pgs.
U.S. Appl. No. 15/911,993, Non-Final Rejection, dated Aug. 5, 2020, 6 pgs.
U.S. Appl. No. 15/969,749, Final Rejection, dated Feb. 26, 2020, 15 pgs.
U.S. Appl. No. 16/179,746, Advisory Action (Ptol-303), Sep. 15, 2020, 2 pgs.
U.S. Appl. No. 16/179,746, Examiner Interview Summary Record (Ptol-413), dated Nov. 5, 2020, 2 pgs.
U.S. Appl. No. 16/362,547, Advisory Action (Ptol-303), dated Nov. 18, 2020, 2 pgs.
U.S. Appl. No. 16/362,547, Examiner Interview Summary Record (Ptol-413), dated Nov. 18, 2020, 1 pg.
U.S. Appl. No. 16/362,547, Final Rejection, dated Sep. 24, 2020,14 pgs.
U.S. Appl. No. 16/362,547,Examiner Interview Summary Record (Ptol-413), dated Nov. 5, 2020, 2 pgs.
U.S. Appl. No. 16/426,323, Notice of Allowance And Fees Due (Ptol-85),dated Aug. 5, 2020, 11 pgs.
U.S. Appl. No. 16/586,868, Notice of Allowance and Fees Due (Ptol-85), dated Oct. 7, 2020, 2 pgs.
U.S. Appl. No. 16/586,868, Notice of Allowance and Fees Due (Ptol-85),dated Jul. 31, 2020,13 pgs.
U.S. Appl. No. 16/586,868, USPTO e-Office Action: CTNF—Non-Final Rejection, dated Dec. 20, 2019, 19 pgs.
U.S. Appl. No. 16/726,090, Non-Final Rejection, dated Nov. 19, 2020, 12 pgs.
U.S. Appl. No. 12/101,883, Examiner Interview Summary dated Sep. 6, 2016, 3 pgs.
U.S. Appl. No. 12/101,883, Examiner Interview Summary dated Oct. 18, 2017, 2 pgs.
U.S. Appl. No. 13/464,588, Non Final Office Action dated Aug. 2, 2019, 14 pgs.
U.S. Appl. No. 14/530,669, Advisory Action dated Aug. 8, 2017, 5 pgs.
U.S. Appl. No. 14/530,669, Examiner Interview Summary dated Apr. 14, 2017, 3 pgs.
U.S. Appl. No. 14/530,669, Examiner Interview Summary dated Aug. 8, 2017, 2 pgs.
U.S. Appl. No. 14/800,638, Examiner Interview Summary dated May 9, 2017, 2 pgs.
U.S. Appl. No. 14/800,638, Examiner Interview Summary dated Nov. 7, 2016, 3 pgs.
U.S. Appl. No. 14/800,638, Examiner Interview Summary dated Dec. 13, 2017, 1 pg.
U.S. Appl. No. 14/800,638, Notice of Allowance dated Dec. 13, 2017, 9 pgs.
U.S. Appl. No. 14/800,640, Advisory Action dated Jan. 5, 2018, 3 pgs.
U.S. Appl. No. 14/800,640, Advisory Action dated Feb. 8, 2018, 2 pgs.
U.S. Appl. No. 14/800,640, Examiner Interview Summary dated Feb. 8, 2018, 1 pg .
U.S. Appl. No. 14/800,640, Examiner Interview Summary dated Oct. 23, 2018, 3 pgs.
U.S. Appl. No. 14/800,640, Final Office Action dated Oct. 16, 2017, 15 pgs.
U.S. Appl. No. 14/800,640, Non Final Office Action dated Jun. 8, 2017, 14 pgs.
U.S. Appl. No. 14/800,640, Non Final Office Action dated Jul. 17, 2018, 16 pgs.
U.S. Appl. No. 14/800,640, Notice of Allowance dated Nov. 21, 2018, 7 pgs.
U.S. Appl. No. 14/800,640, Restriction Requirement dated Mar. 3, 2017, 5 pgs.
U.S. Appl. No. 14/800,642, Advisory Action dated Jan. 5, 2018, 3 pgs.
U.S. Appl. No. 14/800,642, Advisory Action dated Feb. 8, 2018, 3 pgs.
U.S. Appl. No. 14/800,642, Examiner Interview Summary dated Aug. 6, 2018, 1 pg.
U.S. Appl. No. 14/800,642, Final Office Action dated Oct. 17, 2017, 18 pgs.
U.S. Appl. No. 14/800,642, Non Final Office Action dated May 18, 2017, 17 pgs.
U.S. Appl. No. 14/800,642, Non-Final Office Action dated May 18, 2017, 17 pages.
U.S. Appl. No. 14/800,642, Notice of Allowance dated Aug. 6, 2018, 12 pgs.
U.S. Appl. No. 14/819,473, Examiner Interview Summary dated Jul. 11, 2016, 3 pgs.
U.S. Appl. No. 14/819,473, Examiner Interview Summary dated Aug. 17, 2016, 3 pgs.
U.S. Appl. No. 14/819,473, Examiner Interview Summary dated Oct. 14, 2016, 3 pages.
U.S. Appl. No. 14/860,983, Advisory Action dated Jan. 23, 18, 3 pgs.
U.S. Appl. No. 14/860,983, Advisory Action dated Mar. 26, 2019, 2 pgs.
U.S. Appl. No. 14/860,983, Examiner Interview Summary dated Mar. 26, 2019, 2 pgs.
U.S. Appl. No. 14/860,983, Examiner Interview Summary dated Apr. 8, 2019, 3 pgs.
U.S. Appl. No. 14/860,983, Examiner Interview Summary dated Nov. 15, 18, 3 pgs.
U.S. Appl. No. 14/860,983, Final Office Action dated Jan. 18, 19, 19 pgs.
U.S. Appl. No. 14/860,983, Final Office Action dated Oct. 18, 2017, 21 pgs.
U.S. Appl. No. 14/860,983, Non Final Office Action dated Jun. 8, 2017, 26 pgs.
U.S. Appl. No. 14/860,983, Non Final Office Action dated Aug. 7, 2018, 22 pgs.
U.S. Appl. No. 15/408,211, Advisory Action dated Mar. 18, 2019, 4 pgs.
U.S. Appl. No. 15/408,211, Examiner Interview Summary dated Mar. 4, 2019, 3 pgs.

(56) References Cited

OTHER PUBLICATIONS

U.S. Appl. No. 15/408,211, Examiner Interview Summary dated Mar. 18, 2019, 2 pgs.
U.S. Appl. No. 15/408,211, Examiner Interview Summary dated Apr. 3, 2019, 3 pgs.
U.S. Appl. No. 15/408,211, Examiner Interview Summary dated Aug. 5, 2019, 3 pgs.
U.S. Appl. No. 15/408,211, Examiner Interview Summary dated Oct. 16, 2019,2 pgs.
U.S. Appl. No. 15/408,211, Examiner Interview Summary dated Dec. 5, 2018, 3 pgs.
U.S. Appl. No. 15/408,211, Final Office Action dated Jan. 11, 2019, 23 pgs.
U.S. Appl. No. 15/408,211, Non Final Office Action dated Aug. 6, 2018, 22 pgs.
U.S. Appl. No. 15/408,211, Non Final Office Action dated May 2, 2019, 20 pgs.
U.S. Appl. No. 15/425,983, Advisory Action dated Oct. 12, 2018, 5 pgs.
U.S. Appl. No. 15/425,983, Examiner Interview Summary dated May 3, 2018, 3 pgs.
U.S. Appl. No. 15/425,983, Examiner Interview Summary dated May 17, 2018, 3 pgs.
U.S. Appl. No. 15/425,983, Examiner Interview Summary dated Sep. 28, 2018, 3 pgs.
U.S. Appl. No. 15/425,983, Examiner Interview Summary dated Oct. 12, 2018, 2 pgs.
U.S. Appl. No. 15/425,983, Examiner Interview Summary dated Dec. 12, 2018, 2 pgs.
U.S. Appl. No. 15/425,983, Final Office Action dated Jun. 26, 2018, 29 pgs.
U.S. Appl. No. 15/425,983, Non Final Office Action dated Jan. 11, 2018, 29 pgs.
U.S. Appl. No. 15/425,983, Notice of Allowance dated Dec. 12, 2018, 14 pgs.
U.S. Appl. No. 15/425,988, Examiner Interview Summary dated Nov. 30, 2018, 3 pages.
U.S. Appl. No. 15/425,988, Examiner Interview Summary dated Nov. 30, 2018, 3 pgs.
U.S. Appl. No. 15/425,988, Non Final Office Action dated Aug. 10, 2018, 18 pgs.
U.S. Appl. No. 15/425,988, Notice of Allowance dated Dec. 28, 2018, 8 pgs.
U.S. Appl. No. 15/426,994, Advisory Action dated Dec. 13, 2018, 3 pgs.
U.S. Appl. No. 15/426,994, Examiner Interview Summary dated Jan. 15, 2019, 3 pgs.
U.S. Appl. No. 15/426,994, Final Office Action dated Oct. 10, 2018, 21 pgs.
U.S. Appl. No. 15/426,994, Non Final Office Action dated Aug. 6, 2019, 22 pgs.
U.S. Appl. No. 15/427,009, Notice of Allowance dated Sep. 6, 2018, 9 pgs.
U.S. Appl. No. 15/428,104, Advisory Action dated Dec. 13, 2018, 3 pgs.
U.S. Appl. No. 15/428,104, Examiner Interview Summary dated Jan. 15, 2019, 3 pgs.
U.S. Appl. No. 15/428,104, Examiner Interview Summary dated Dec. 7, 2018, 3 pgs.
U.S. Appl. No. 15/428,104, Final Office Action dated Oct. 10, 18, 23 pgs.
U.S. Appl. No. 15/428,104, Non Final Office Action dated Apr. 19, 2018, 21 pgs.
U.S. Appl. No. 15/428,104, Non Final Office Action dated Aug. 6, 2019, 24 pgs.
U.S. Appl. No. 15/620,506, Advisory Action dated Aug. 26, 2019, 2 pgs.
U.S. Appl. No. 15/620,506, Examiner Inteview Summary dated Aug. 26, 2019, 1 pg.
U.S. Appl. No. 15/620,506, Final Office Action dated Jun. 10, 2019, 17 pgs.
U.S. Appl. No. 15/620,506, Non Final Office Action dated Jan. 23, 2019, 13 pgs.
U.S. Appl. No. 15/620,506, Non-Final Office Action dated Jan. 23, 2019, 13 pages.
U.S. Appl. No. 15/632,709, Examiner Interview Summary dated Apr. 30, 2018, 1 pg.
U.S. Appl. No. 15/632,709, Final Office Action dated Jul. 17, 2018, 12 pgs.
U.S. Appl. No. 15/632,709, Non Final Office Action dated Apr. 3, 2019, 13 pgs.
U.S. Appl. No. 15/632,709, Non Final Office Action dated Apr. 30, 2018, 14 pgs.
U.S. Appl. No. 15/632,709, Notice of Allowance dated May 3, 2021, 9 pgs.
U.S. Appl. No. 15/673,125, Examiner Interview Summary dated Aug. 1, 2019, 3 pgs.
U.S. Appl. No. 15/673,125, Final Office Action dated Jun. 3, 2019, 17 pgs.
U.S. Appl. No. 15/673,125, Non Final Office Action dated Feb. 6, 2019, 17 pgs.
U.S. Appl. No. 15/682,362, Notice of Allowance dated Oct. 22, 2018, 9 pgs.
U.S. Appl. No. 15/713,406, Examiner Interview Summary dated Aug. 2, 2019, 3 pgs.
U.S. Appl. No. 15/713,406, Final Office Action dated Jun. 3, 2019, 21 pgs.
U.S. Appl. No. 15/713,406, Non Final Office Action dated Jan. 30, 2019, 21 pgs.
U.S. Appl. No. 15/717,889, Advisory Action dated Jul. 6, 2021, 3 pgs.
U.S. Appl. No. 15/717,889, Examiner Interview Summary dated Jun. 4, 2021, 2 pgs.
U.S. Appl. No. 15/717,889, Examiner Interview Summary dated Jul. 6, 2021, 2 pgs.
U.S. Appl. No. 15/717,889, Final Office Action dated Mar. 4, 2021, 37 pgs.
U.S. Appl. No. 15/724,081, Examiner Interview Summary dated Mar. 4, 2019, 3 pgs.
U.S. Appl. No. 15/724,081, Examiner Interview Summary dated Jul. 30, 2019, 3 pgs.
U.S. Appl. No. 15/724,081, Examiner Interview Summary dated Aug. 20, 2019, 2 pgs.
U.S. Appl. No. 15/724,081, Final Office Action date May 14, 2019, 14 pgs.
U.S. Appl. No. 15/724,081, Non Final Office Action dated Dec. 11, 2018, 12 pgs.
U.S. Appl. No. 15/724,081, Notice of Allowance dated Aug. 20, 2019, 12 pgs.
U.S. Appl. No. 15/724,087, Final Office Action dated Jul. 1, 2019, 16 pgs.
U.S. Appl. No. 15/724,087, Non Final Office Action dated Jan. 31, 2019, 15 pgs.
U.S. Appl. No. 15/911,993, Notice of Allowance dated Jan. 12, 2021, 8 pgs.
U.S. Appl. No. 15/969,749, Examiner Interview Summary dated Apr. 20, 2021, 1 pg.
U.S. Appl. No. 16/179,746, Examiner Interview Summary dated Jun. 3, 2021, 1 pg.
U.S. Appl. No. 16/179,746, Final Office Action dated Jun. 3, 2021, 25 pgs.
U.S. Appl. No. 16/179,746, Non-Final Office Action datd Feb. 11, 21, 25 pgs.
U.S. Appl. No. 16/362,547, Examiner Interview Summary dated Jul. 12, 2021, 2 pgs.
U.S. Appl. No. 16/362,547, Non-Final Office Action dated Mar. 23, 2021, 14 pgs.
U.S. Appl. No. 16/384,578, Corrected Notice of Allowance dated Nov. 26, 2019, 2 pgs.
U.S. Appl. No. 16/384,578, Non Final Office Action dated May 9, 2019, 9 pgs.

(56) References Cited

OTHER PUBLICATIONS

U.S. Appl. No. 16/726,090, Advisory Action dated Jun. 21, 2021, 3 pgs.
U.S. Appl. No. 16/726,090, Examiner Interview Summary dated Feb. 25, 2021, 3 pgs.
U.S. Appl. No. 16/726,090, Examiner Interview Summary dated Jun. 21, 2021, 1 pg.
U.S. Appl. No. 16/726,090, Final Office Action dated Mar. 12, 2021, 13 pgs.
Belongie, Serge, Jitendra Malik, and Jan Puzicha. "Shape matching and object recognition using shape contexts." IEEE Transactions on Pattern Analysis & Machine Intelligence 4 (2002): 509-522. (Year: 2002).
Buehler, Chris et al., "Unstructured Lumigraph Rendering", ACM, ACM SIGGRAPH, 2001, pp. 425-432.
Davis, Abe et al., "Unstructured Light Fields", Blackwell Publishing, Computer Graphics Forum, vol. 31, Issue 2, Pt. 1, May 2012, pp. 305-314.
Extract all frames from video files, Video Help Forum, Oct. 2010, 3 pages.
Fischler, Martin A . . . , et al., Random Sample Consensus: A Paradigm for Model Fitting with Applications to Image Analysis and Automated Cartography, ACM, Communications of the ACM, vol. 24, No. 6, Jun. 1981, 381-395 pgs.
Fitzgibbon, Andrew, "Automatic 3D Model Acquisition and Generation of New Images from Video Sequences", IEEE, 9th European Signal Processing Conference, Sep. 1998, 8 pgs.
Fusiello, Andrea et al., "View Synthesis from Uncalibrated Images Using Parallax", Proceedings of the 12th International Conference on Image Analysis and Processing, 2003, pp. 146-151.
Fusiello, Andrea, Specifying Virtual Cameras in Uncalibrated View Synthesis, IEEE Transactions on Circuits and Systems for Video Technology, vol. 17, No. 5, May 2007, 8 pages.
Gibson, Simon, et al., Accurate Camera Calibration for Off-line, Video-Based Augmented Reality, IEEE, Proceedings of the International Symposium on Mixed and Augmented Reality (ISMAR'02) 10 pages.
Haines, Russell, U.S. Appl. No. 62/380,914, Specification and Drawings, p. 1-24 (Year: 2016).
International Application Serial No. PCT/US19/30395, Preliminary Report on Patentability dated Nov. 12, 2020, 7 pgs.
Intl Application Serial No. PCT/US17/47684, Intl Preliminary Report on Patentability dated Feb. 28, 2019, 7 pgs.
Intl Application Serial No. PCT/US17/47684, Intl Search Report and Written Opinion dated Oct. 27, 2017, 8 pgs.
Intl Application Serial No. PCT/US17/47859, Intl Preliminary Report on Patentability dated Feb. 28, 2019, 7 pgs.
Intl Application Serial No. PCT/US17/47859, Intl Search Report and Written Opinion dated Nov. 2, 2017, 8 pgs.
Intl Application Serial No. PCT/US19/030395, Intl Search Report and Written Opinion dated Sep. 2, 2019, 9 pgs.
Klappstein, Jens, et al., Moving Object Segmentation Using Optical Flow and Depth Information, Springer, In: Wada T., Huang F., Lin S. (eds) Advances in Image and Video Technology. PSIVT 2009. LectureNotes in Computer Science, vol. 5414, 611-623 pgs.
Li, Mingyang, Byung Hyung Kim, and Anastasius 1. Mourikis. "Real-time motion tracking on a cellphone using inertial sensing and a rolling-shutter camera." 2013 IEEE International Conference on Robotics and Automation. IEEE, 2013. (Year: 2013) 8 pages.
Matsunobu, Tom et al., U.S. Appl. No. 62/457,276, Specification, p. 1-19 (Year: 2017).
Mikolajczyk, Krystian, et al., A Performance Evaluation of Local Descriptors, IEEE Transactions on Pattern Analysis and Machine Intelligence, vol. 27, No. 10, Oct. 2005, 1615-1630.
Notice of Allowance dated Apr. 20, 2021 for U.S. Appl. No. 15/969,749 (pp. 1-5).
Notice of Allowance dated Jun. 17, 2021 for U.S. Appl. No. 15/604,938 (pp. 1-12).
Notice of Allowance dated May 3, 2021 for U.S. Appl. No. 15/632,709 (pp. 1-9).
Nützi, Gabriel, et al. "Fusion of IMU and vision for absolute scale estimation in monocular SLAM." Journal of intelligent & robotic Systems 61.1-4 (2011): 287-299. (Year: 2011).
Office Action (Final Rejection) dated Aug. 20, 2021 for U.S. Appl. No. 16/362,547 (pp. 1-15).
Office Action (Non-Final Rejection) dated Sep. 22, 2021 for U.S. Appl. No. 16/726,090 (pp. 1-15).
Office Action (Notice of Allowance and Fees Due (PTOL-85)) dated Sep. 16, 2021 for U.S. Appl. No. 16/179,746 (pp. 1-5).
Office Action (Notice of Allowance and Fees Due (PTOL-85)) dated Sep. 30, 2021 for U.S. Appl. No. 16/179,746 (pp. 1-2).
Office Action dated Apr. 1, 2021 for U.S. Appl. No. 15/427,030 (pp. 1-18).
Office Action dated Apr. 1, 2021 for U.S. Appl. No. 16/389,544 (pp. 1-29).
Office Action dated Apr. 9, 2021 for U.S. Appl. No. 16/554,996 (pp. 1-29).
Office Action dated Jun. 3, 2021 for U.S. Appl. No. 16/179,746 (pp. 1-26).
Office Action dated Mar. 12, 2021 for U.S. Appl. No. 16/726,090 (pp. 1-14).
Office Action dated Mar. 23, 2021 for U.S. Appl. No. 16/362,547 (pp. 1-15).
Pollard, Stephen et al., "Automatically Synthesising Virtual Viewpoints by Trinocular Image Interpolation—Detailed Report", HP, Technical Report, HP Laboratories Bristol HPL-97-166, Dec. 1997, 40 pgs.
Prisacariu, Victor A. et al., "Simultaneous 3D Tracking and Reconstruction on a Mobile Phone", IEEE International Symposium on Mixed and Augmented Reality, 2013, pp. 89-98.
Qi Pan et al., "Rapid Scene Reconstruction on Mobile Phones from Panoramic Images", Oct. 2011, pp. 55-64 (Year: 2011).
Russell, Bryan C, etal. "LabelMe: a database and web-based tool forimage annotation." International Journal of Computer vision 77.1-3 (2008): 157-173. (Year: 2008).
Shin, Hong-Chang et al., "Fast View Synthesis using GPU for 3D Display", IEEE Transactions on Consumer Electronics, vol. 54, No. 4, Dec. 2008, pp. 2068-2076.
Supplemental Notice of Allowability dated May 5, 2021 for U.S. Appl. No. 15/969,749 (pp. 1-2).
Torr, P.H.S. et al., "Robust Parameterization and Computation of the Trifocal Tensor", Elsevier, Image and Vision Computing, vol. 15, Issue 8, Aug. 1997, pp. 591-605.
Utasi, Ákos, and Csaba Benedek. "A multi-view annotation tool for people detection evaluation." Proceedings of the 1st international Workshop on Visual interfaces forground truth collection in Computer vision applications. ACM, 2012. (Year: 2012) 7 pages.
Weigel, Christian, et al., Advanced 3D Video Object Synthesis Based on Trilinear Tensors, IEEE Tenth International Symposium on Consumer Electronics, 2006, 5 pages.
Xiao, Jiangjian et al., "Tri-view Morphing", Elsevier, Computer Vision and Image Understanding, vol. 96, Issue 3, Dec. 2004, pp. 345-366.
Zhang, Guofeng, et al., Video stabilization based on a 3D perspective camera model, Springer, The Visual Computer (2009) 25, 997 pg.
Zhang, Zhengyou, et al., A robust technique for matching two uncalibrated images through the recovery of the unknown epipolar geometry, Elsevier, Artificial Intelligence 78, 1995, 87-119 pgs.
Zheng, et al., Conditional Random Fields as Recurrent Neural Networks, IEEE International Conference on Computer Vision, 1529-1537 pgs.

* cited by examiner

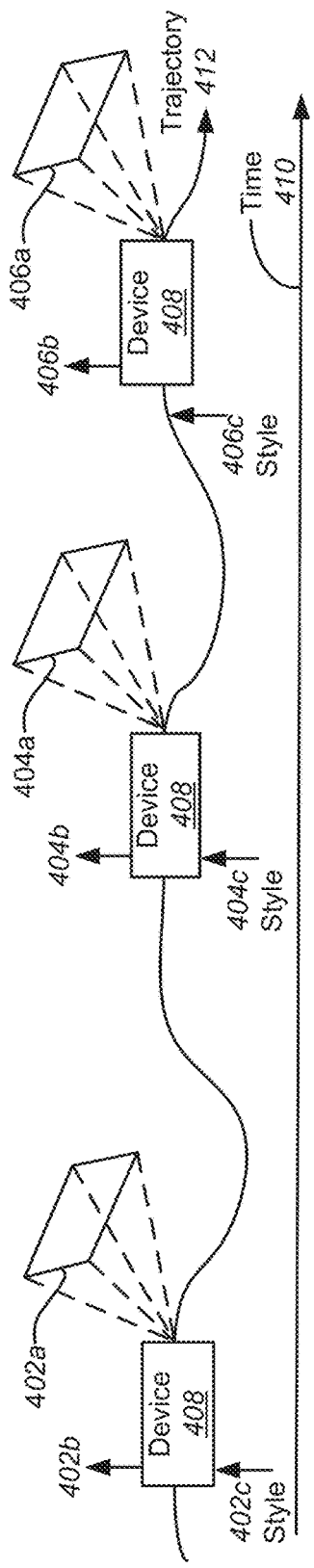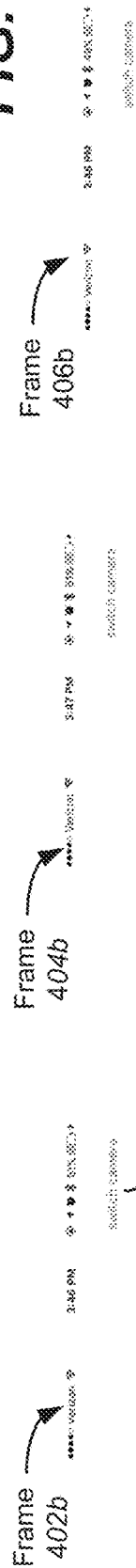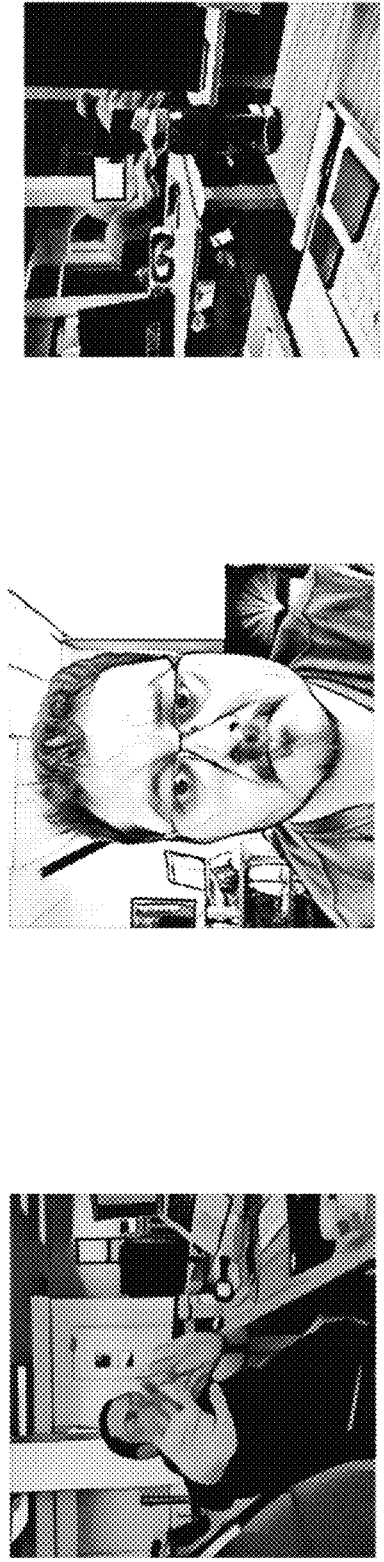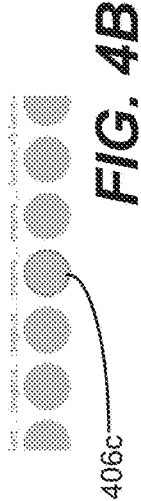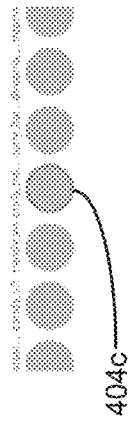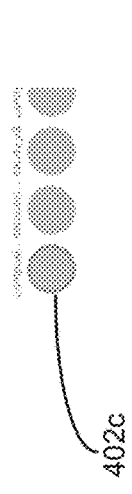
FIG. 4A
FIG. 4B

LIVE STYLE TRANSFER ON A MOBILE DEVICE

CROSS REFERENCE TO RELATED APPLICATION

This application claims the benefit of U.S. Provisional Application No. 62/405,185, filed on Oct. 6, 2016, which is incorporated by reference herein in its entirety for all purposes.

TECHNICAL FIELD

The present disclosure relates to transforming and generating images using neural nets. In particular, the present disclosure relates to generating and manipulating multi-view interactive digital media representations.

DESCRIPTION OF RELATED ART

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out.

For real-time video data, such as the live video feed from a camera system to a display on a mobile device, interactions involving the live video feed are not provided. The user is only able to view on the display an unmodified portion of the environment captured in the live video feed. Accordingly, methods and apparatus that allow for a live video feed to be altered are desirable.

OVERVIEW

Provided are various mechanisms and processes relating to modifying a live video feed in real-time. In one embodiment, a trained neural network is used to interpolate native video data received from a camera system on a mobile device in real-time. The interpolation converts the live native video data into a particular style. For example, the style can be associated with a particular artist or a particular theme. The stylized video data can viewed on a display of the mobile device in a manner similar to which native live video data is output to the display. Thus, the stylized video data, which is viewed on the display, is consistent with a current position and orientation of the camera system on the display In one embodiment, a method can be generally characterized as comprising: 1) receiving, on a mobile device, weighting factors associated with a neural network wherein the neural network is trained to convert video images to a style; 2) receiving a live feed of video data from a camera system on the mobile device where a position and orientation of the camera system can be changing as a function of time; 3) applying the neural network to frames in the video data to transform the frames to the style associated with the neural network; and 4) outputting the transformed video data to a display of the mobile device in real-time as the position and the orientation of the camera system is changing such that transformed video data output to the display appears consistent with a current position and a current orientation of the camera system.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present invention.

FIGS. 4A and 4B illustrate examples of video data from a transformed live video feed output to a display at various times.

DETAILED DESCRIPTION

Figure 1:
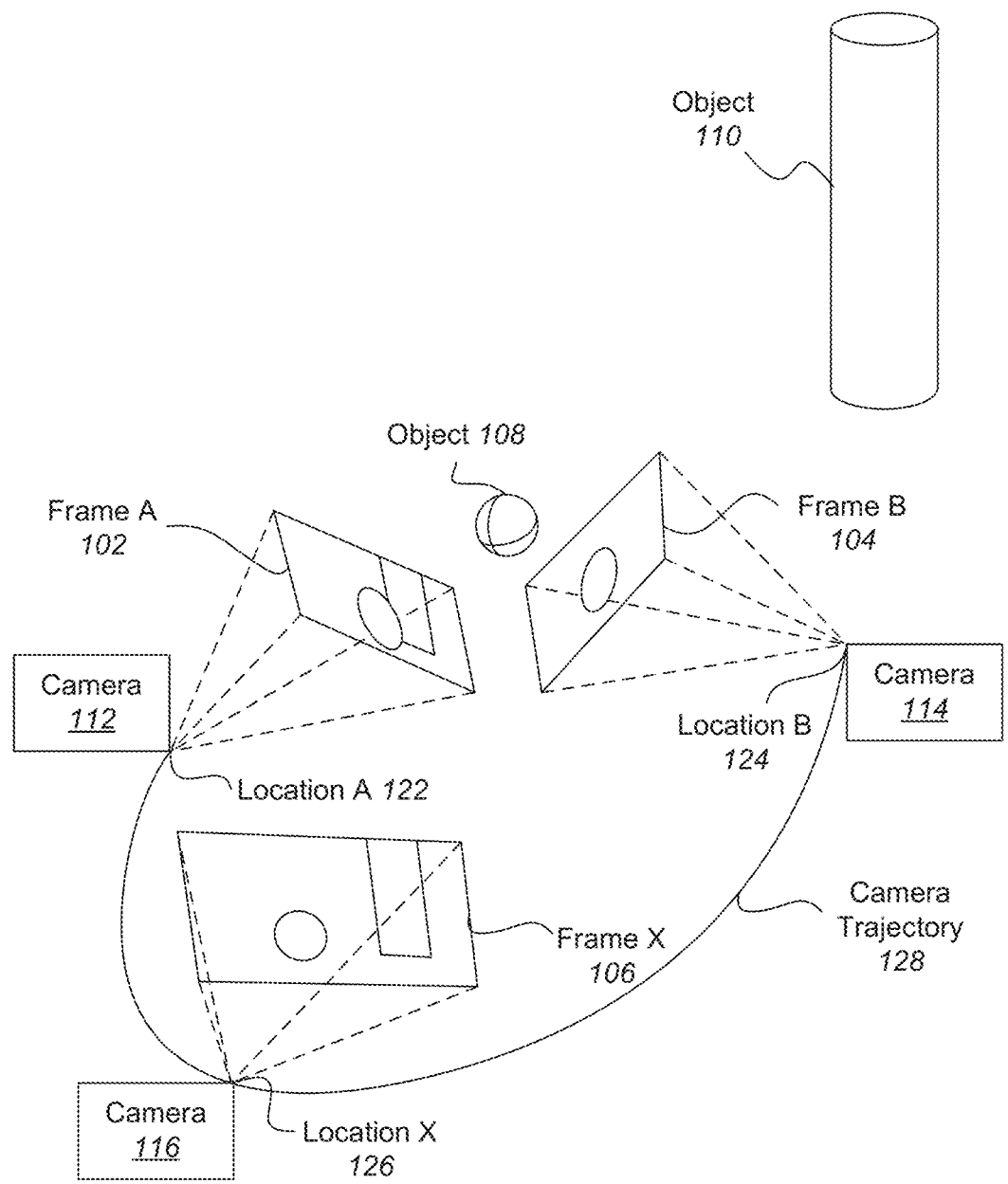
FIG. 1 illustrates an example of a configuration where an artificially rendered image is generated for a chosen viewpoint on a trajectory between two frames.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

According to various embodiments, multi-view interactive digital media representation (MVIDMR) are discussed. As described in more detail below, style transformations are provided which allow a style of a MVIDMR to be modified and inserted into a video feed output to a display. In general, the style transformations can be applied to a live video feed such a transformed live video feed is viewable in real-time. For example, a live video feed can be provided on a mobile device and transformed. Then, instead of watching the live video feed on the display, the user can view in real-time the transformed live video feed on the display. During this process, the live video feed or the transformed live video feed may or may not be recorded.

The style transformations can significantly alter the look and feel of the live video feed and/or the MVIDMR. For example, a style transformation can transform a live video feed so all the images look cartoonish. In other example, a style transformation can transform a live video feed to mimic the style of a particular artist or even a particular painting by the artist, such as "Starry night" by Vincent Van Gogh. The style transformation can be applied to all or a portion of each image in the live video. For example, only people detected in the image data of the live video feed may be altered whereas remaining portions of the image remain unaffected.

As follows details, methods of generating MVIDMRs are described with respect to FIGS. 1, 7, 8 and 9. Methods and apparatus for transforming a style of a live video feed are described in more detail with respect to FIGS. 2-6. In particular, the application of neural networks to transform image data contained in a live video feed are described with respect to FIG. 6.

Returning to a description of MVIDMRs, the data used to generate a MVIDMR can come from a variety of sources. In particular, data such as, but not limited to, two-dimensional (2D) images can be used to generate a MVIDMR. These 2D images can include color image data streams such as multiple image sequences, video data, etc., or multiple images in any of various formats for images, depending on the application. Another source of data that can be used to generate a MVIDMR includes location information. This location information can be obtained from sources such as accelerometers, gyroscopes, magnetometers, GPS, WiFi, IMU-like systems (Inertial Measurement Unit systems), and the like. Yet another source of data that can be used to generate a MVIDMR can include depth images. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together. In some embodiments, a MVIDMR can be generated by a combination of data that includes both 2D images and location information, without any depth images provided. In other embodiments, depth images and location information can be used together. Various combinations of image data can be used with location information, depending on the application and available data.

In the present example embodiment, the data that has been fused together is then used for content modeling and context modeling. According to various examples, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. In various embodiments, the models provided by content modeling and context modeling can be generated by combining the image and location information data.

According to various embodiments, context and content of a MVIDMR are determined based on a specified object of interest. In some examples, an object of interest is automatically chosen based on processing of the image and location information data. For instance, if a dominant object is detected in a series of images, this object can be selected as the content. In other examples, a user specified target can be chosen. It should be noted, however, that a MVIDMR can be generated without a user specified target in some applications.

In the present example embodiment, one or more enhancement algorithms can be applied. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some examples, these enhancement algorithms can be applied to image data after acquisition of the data. In other examples, these enhancement algorithms can be applied to image data during capture of MVIDMR data.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In the present embodiment, a MVIDMR can be generated after any enhancement algorithms are applied. In various examples, the MVIDMR can include a three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR and provide the capability for use in various applications. For instance, MVIDMRs can be used to enhance various fields such as e-commerce, visual search, 3D printing, file sharing, user interaction, and entertainment.

As described above, view interpolation can be used to improve the viewing experience. In particular, to avoid sudden "jumps" between stabilized frames, synthetic, intermediate views can be rendered during acquisition or generation of a MVIDMR. However, according to various embodiments, only a limited amount of image frames are stored for each MVIDMR for storage efficiency. In some examples, the selection of these frames is based on the motion of the camera rather than on time. For instance, a new frame is sampled only if the camera moved sufficiently with respect to the previously sampled frame. Consequently, in order to provide a smooth viewing experience for a user interacting with a MVIDMR, artificially rendered frames must be generated. These artificially rendered frames serve to close the gap between two sampled frames that would otherwise appear to have a "jump" between them. Accordingly, by generating these artificially rendered frames, smooth navigation within the MVIDMR becomes possible.

Various embodiments described below include methods of viewpoint interpolation and extrapolation that can be used to generate artificially rendered frames. In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a MVIDMR.

With reference to FIG. 1, shown is an example of a configuration where an artificially rendered image is generated for a viewpoint at Location X on a trajectory between Location A and Location B. In this example, a single transform for viewpoint interpolation is used along the trajectory between two frames, Frame A 102 and Frame B 104. As shown, Frame A 102 represents an image captured of objects 108 and 110 by a camera 112 located at Location A 122. Frame B 104 represents an image captured of object 108 by a camera 114 located at Location B 124. In the present example, the transformation (T_AB) is estimated between the two frames, where T_AB maps a pixel from frame A to frame B. This transformation is performed using methods such as homography, affine, similarity, translation, rotation, or scale.

In the present example, an artificially rendered image at Location X 126, which can also be denoted as a viewpoint position at x \in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 102 to Frame X 106 based on T_AX and by transferring image information from Frame B 104 to Frame X 106 based on T_XB. Finally, the image information gathered from both Frames A and B is combined to generate an artificially rendered image at Location X 126.

Figure 2:
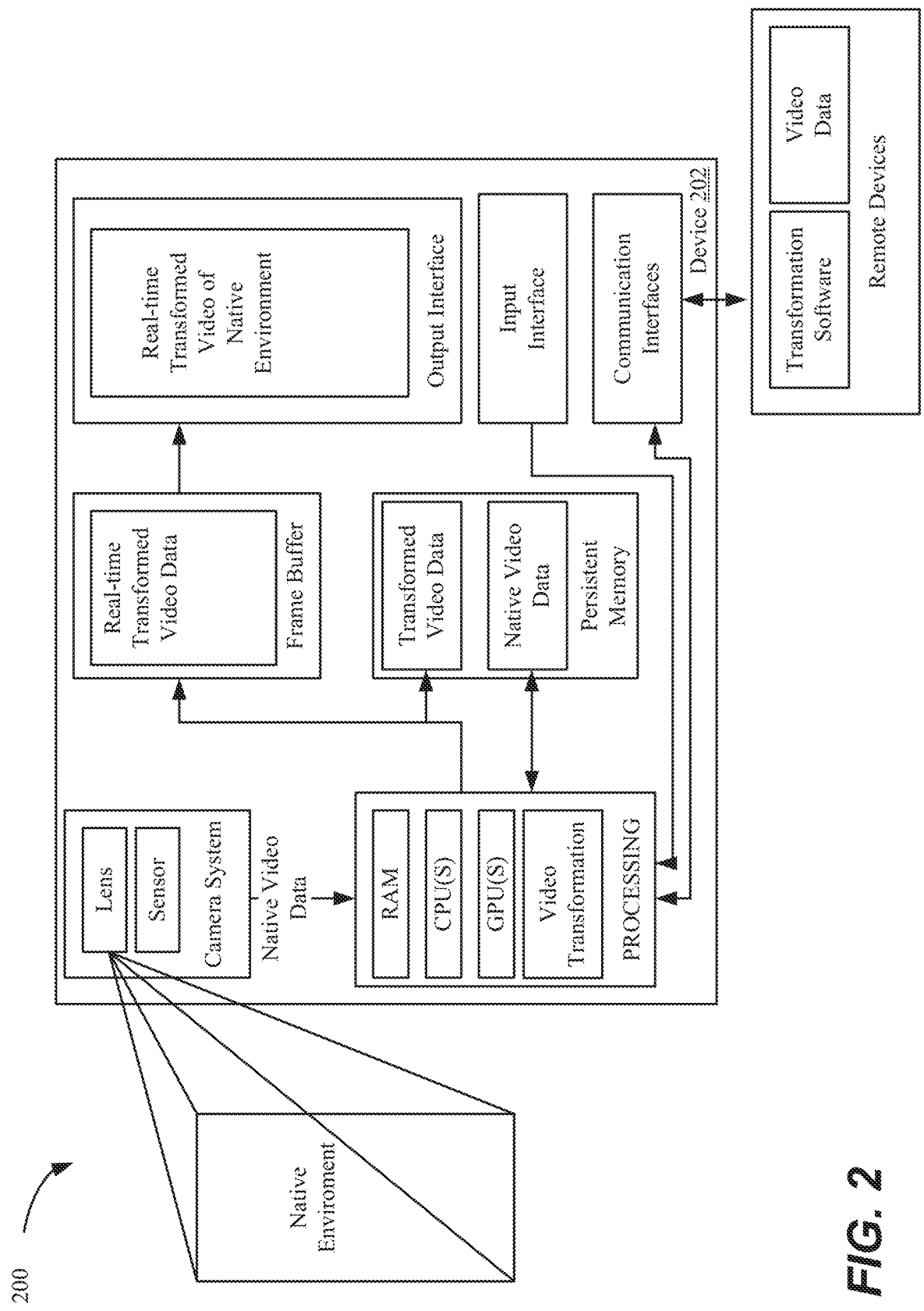
FIG. 2 illustrates an example of a system for capturing, transforming and outputting in real-time transformed video data from a live video feed.

FIG. 2 illustrates an example of a system 200 for capturing, transforming and outputting in real-time transformed video data from a live video feed. As described above and with more detail below, the transformation can involve transforming live video data in accordance with a particular style and then outputting the transformed video data in real-time to a display. In FIG. 2, the system can include a camera system having components, such as a lens and a sensor. Via the lens and the sensor, the camera system can be configured to capture a live video feed of some portion of a native environment as a function of time.

The portion of the native environment which is captured can vary according to such factors as the direction the camera is pointed, optical zooming, digital zooming and the size/density of the sensor elements on the sensor. Depending on the camera capabilities, the camera can be configured to capture the video images at different frame rates and resolutions. For example, a camera may be able to record video data at varying resolutions, such as 4K, 1440p, 1080p, 720p, 480p, 360p or 240p and at varying frame rates, such as 60 frame per second (FPS), 30 fps, 15 fps, etc. The resolution and frame rate can be user selectable. Thus, during a recording session, these parameters can vary as a function of time.

The camera system can be configured to output native video data as a live video feed. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform all or a portion of specific transformation on a video frame, such as a style transformation. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply a transformation to determine second RGB values at each pixel location. The second RGB values can be associated with a transformed video frame. After the transformed video frame is generate, the native video frame and/or the transformed video frame can be sent to a persistent memory, such as a flash memory or a hard drive, for storage. In addition, the transformed video data and/or native video data can be sent to a frame buffer for output on a display or displays associated with an output interface. For example, the display can be the display on a mobile device or a view finder on a camera.

In particular embodiments, the transformed video data can be output to a display where neither the transformed video data nor the native video data is stored in a persistent memory. In another embodiment, the transformed video data can be output and stored to persistent memory. In yet another embodiment, the transformed video can be output and the native video data and transformed video data can be stored to persistent memory.

In a further embodiment, the transformed video data can be output and the native video data can be stored with meta-data about the transformation which was applied to the native video data. Thus, the transformed video data can be output again at a later time by applying the transformation described in the meta data to the native data stored in persistent memory. Thus, instead of receiving the native video data from the camera system, the processing system receives the native video data from persistent memory and then can output it to the output interface. Alternatively, another transformation type of transformation, such as a style transformation, can be applied to the native video data and output.

In yet another embodiment, both the transformed video data and the native video data can be output in a side-by-side manner. For example, the video frame can be created that includes the native video data in a top portion of the video frame and the transformed video data can be shown in a bottom portion of the video frame which is output on the display. This process may require multiple video transformations. First, the native video data can be transformed, such as stylized, where the native video data and the transformed video data are in a first and second resolution, respectively. Then, if necessary, the native video data and the transformed video data can be interpolated to a third and fourth resolutions, resolutions respectively and combined into a single video frame for output to the display.

In general, the video transformations can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

In particular embodiments, the video transformations are based upon using only the video data contained in a single video frame. Thus, based upon only the pixel data in a first video frame, a transformed second video frame is generated. In other embodiments, the transformation of a first video frame can involve pixel data from the first video frame and one or more additional frames. For example, a first video frame can be transformed based upon the video data contained in the first video frame and one or more previous video frames. As another example, a first video frame can be transformed based upon the video data contained in the first video frame, a previous video frame and a subsequent video frame.

In FIG. 2, the system 200 including the camera system, processing system, frame buffer, persistent memory, output interface, input interface and communication interface can be integrated into a single device, such as device 202, with a common housing, such as a mobile device like a smart phone, an augmented reality and wearable device like Google Glass™ or a virtual reality head set that includes a camera. In other embodiments, the system 200 can be partially integrated. For example, the camera system can be a remote camera system. As another example, the display can be separate from the rest of the components like on a desktop PC.

In yet another example, the system 200 can be integrated into a transportation device like a car or an airplane which includes live video feeds. For example, newer airplanes typically include one or more live video feeds from outside. A passenger is allowed to select from one or more of the video feeds from outside and then output the live video feed to a display at their seat. In one embodiment, a video transformation, which could be user selectable by each passenger for their display, could be selected. Then, the transformed video data could be output at the user's seat. In another, a video transformation could be applied to a video data from a camera system in an automobile and then output.

In various embodiments, the video data can be provided from a number of different sources. For example, on device 202, a video feed can be provided from a remote camera system, such as a camera system on another device or a stand-alone camera system, such as surveillance system. In another example, the video feed can be provided from videos stored in persistent memory. In yet another example, the video feed can be provided from a video source stored remotely, such as from a video streaming provider like Youtube,™ or Netflix,™ where a user may be able to select and change on the fly a video transformation that is applied to the video stream before it is output to user's display. In another example, a TV signal from an open air broadcast, a cable or from the Internet can be received and transformed prior to output to a display, such as on a TV set. The transformation can be performed locally on the user's device or remotely. When the transformation is performed remotely, the device can receive a stream of transformed video data in accordance with selections made by the user.

In yet other embodiments, live video feeds from multiple sources can be received, transformed, combined and output to a single video display. For example, during a video conference, device 202 may receive live video feeds from multiple sources via the communication interfaces. Via the input interfaces, the user may be able to select a video transformation for each of the multiple sources. The video transformation may be the same for all the sources or may vary from source. Also, some of the video sources may not be transformed. The video sources whether unaltered or transformed and then combined into a single video for output to the display.

Video transformations can also be applied using the transformation software and/or hardware on the remote devices. These transformations can be made in response to user selections made on the remote device. Thus, the device 202 may receive transformed video data from the remote devices. In this embodiment, the user may not be able to control the video transformations performed on the remote device.

In particular embodiments, a coordinator (similar to DJ or video jockey) selects a transformation, such as a style to use. The transformed video signal can be output and/or received on one or more devices. In another embodiment, within a group of users, the users can vote which style is used and based on these votes a video transformation is selected (and potentially changed over time). The transformed video can be received on a group of devices, such as individual mobile devices, controlled by the group of users.

In yet another example, the system 200 can be configured to automatically select video transformation, such as styles, based on the content (and/or context) of the scene or where the system selects a subset of styles for the user to select from. The selection criteria for the automatic system are hereby not limited to the visual scene only, it can also use location information and/or the user's preference, or other user's preferences on similar scenes, or social information for styles applied on similar scenes, e.g. if a style was applied on similar scenes and got a lot of likes, etc. It could also be based on events that are currently happening (potentially also in connection with the location) or with non-visual parameters of the scene, e.g. temperature, ambient noise or audio contained with the video.

Next, with respect to FIGS. 3-6, methods for transforming video data are described. In a particular embodiment, a neural network is trained to mimic a particular style, such as giving a video frame a cartoonish look. In a video transformation, the RGB pixel values at each location in a video frame are altered from a first value to a second value. The neural net is trained to determine how the pixel values at each location in the video frame relate to the new values at each pixel location after the transformation. The neural net can be described as a set of weighting factors and a connection scheme.

The pixel data in a video frame can be represented as a vector of data values. The vector is multiplied by a matrix of values to perform a transformation. To determine the values in the transformation matrix used to transform the native video data, a neural net is trained. The application of the transformation can result in a transformed vector of video data. The transformed vector of video data can be output to a display.

In one embodiment, the values in the transformation matrix used to perform a particular transformation, such as a style transformation, can be pre-generated as part of training a neural net. Referring back to FIG. 2, the values can be downloaded to device 202. For example, a matrix of values associated with a style transformation can be downloaded from one of the remote devices to device 202. Then, the matrix of values can be used to perform the style transformation of the native video data on device 202. An advantage of doing the transformation locally is increased privacy control of the video data.

To increase the speed of the transformation the number of channels which are used in the neural can be reduced, which reduces the weights used in the neural net. As an example, on an iPhone 6S™ operating on a 512×512 image, if ¼ of the weights used in the normal (original) neural network are used a frame rate of about 15-17 fps can be obtained. When ⅓ of the weights are used, a frame rate of about 10 fps can be obtained. Thus, the transformation video data received from the camera system can be viewed in real-time. More details of style transformations using neural nets are described below with respect to FIG. 6.

Figure 3:
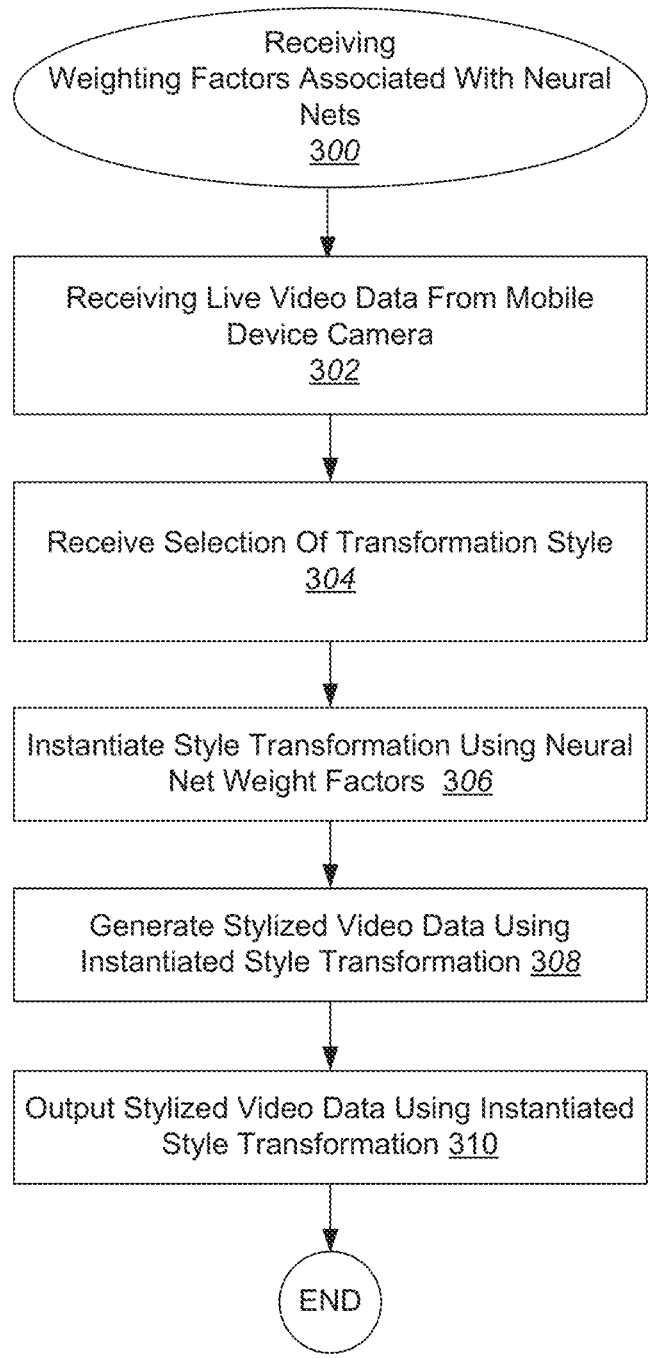
FIG. 3 illustrates an example of a process for capturing, transforming and outputting in real-time transformed video data from a live video feed.

FIG. 3 illustrates an example of a process for capturing, transforming and outputting in real-time transformed video data from a live video feed. In 300, weighting factors associated with a neural net pre-trained to generate a particular transformation style can be downloaded to a device, such as a mobile device. In 302, a video data from a video source, such as i) a live video feed from a camera system on a mobile device, ii) pre-recorded video data stored in a persistent memory on the mobile device and/or iii) pre-recorded video streamed to the mobile device, can be received.

A number of style transformations may be possible. In 304, a selection from among a group of transformation styles can be received. In 306, based upon the selected transformation style, a style transformation can be instantiated which utilizes the downloaded neural net weighting factors. In 308, playback of native video data can be initiated. Prior to its output, the native video data can be transformed in real-time using the instantiated style associated with the neural net. Then, the stylized video data can be output to a display. The transformation can take place in real-time to allow video data from a source, such as a camera system, on a mobile device to be output on the display of the mobile device as the orientation and position of the camera changes as a function of time.

FIGS. 4A and 4B illustrate examples of video data from a transformed live video feed output to a display at various times. In FIG. 4A, a device 408 is moved along a trajectory 412 as a function of time 410. The device includes a camera system. The position and orientation of the camera system can be changing as a function of time. Thus, different portions of an environment, such as 402*a*, 404*a* and 404*b* can be captured as function of time.

In one embodiment, the device 408 can be a mobile device, such as Iphone™. The device 408 can store weighting factors associated with neural nets used in a number of different style transformations. As the device and camera system are moving, different selections of style transformations can be received, such as 402*c*, 404*c* and 406*c*. In accordance with the selected style transformations, video data can be transformed in real-time and the transformed video data can be output to a display.

Typically, when a camera application is instantiated on a mobile device, a live video feed is output to a display on the mobile device from the camera system. The camera system can include one or more cameras, such as a front facing camera and a rear facing camera. If desired, a user can provide inputs that cause a picture from the live video feed to be captured or video data from the live video feed to be recorded. The captured picture or the recorded video data can be stored to a persistent memory on the mobile device.

In FIG. 4B, screen shots, 402b, 404b and 406b, are shown. The screen shots each include a transformed video image. The mobile device is being panned around an office. Rather than viewing the native video data, transformed video data is being output in real-time according to a selected transformation style, such as 402c, 404c and 406c. The transformed video data changes as the camera position and orientation is changed. Thus, it is in accordance with what the user can actually see with their eyes.

If desired, the user can take snap shots from the transformed video data or start recording 414 the transformed video data. Also, the user can switch the video source which is transformed. For example, the user can switch 416 between the front facing and rear facing cameras. As can be seen in the pictures, the styles vary as a function of time. For example, frame 404b shows a style that appears to be a hand drawn image.

Figure 5:
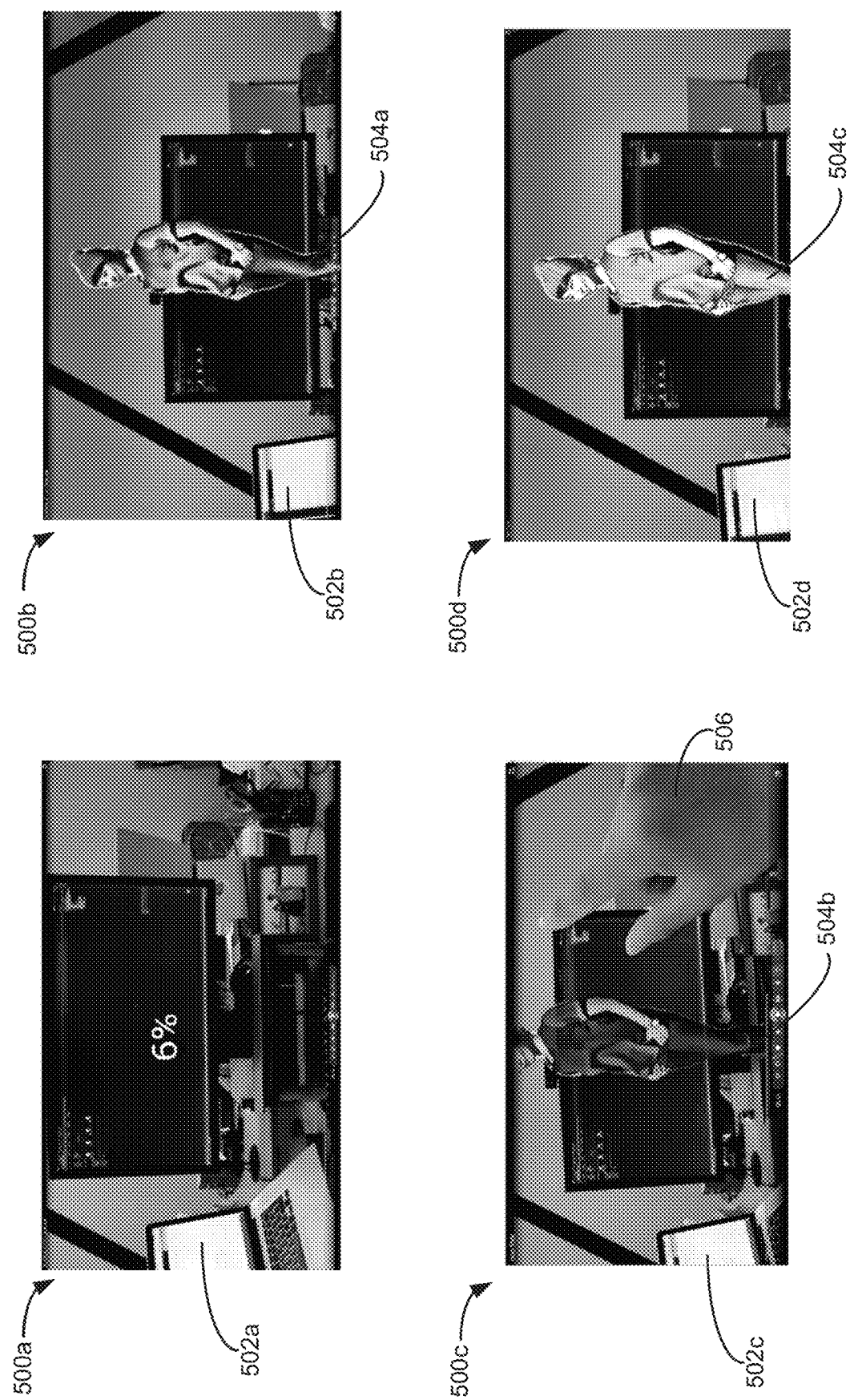
FIG. 5 illustrates an example of a transformed MVIDMR inserted into a live video feed.

FIG. 5 illustrates an example of a transformed MVIDMR inserted into a live video feed. The MVIDMR is described in more detail with respect to FIGS. 1, 7, 8 and 9. In FIG. 5, the context of the MVIDMR is live video data recorded on a mobile device, which is being held in a user's hand. Four video frames, 500a, 500b, 500c and 500d are shown.

The context for the MVIDMR in each video frame is 502a, 502b, 502c and 502d, respectively. In this example, the video data associated with the context in the MVIDMR is not transformed. Thus, it is the live video feed from the camera system on the mobile device. In alternate embodiments, the content can be transformed in accordance with one of the styles described with respect to FIGS. 4A and 4B.

In frames, 500b, 500c and 500d, the content of a MVIDMR, which is an image of a woman, is combined with the video data from the live video feed. The image data associated with the woman, 504a, 504b and 504c, has been transformed according to a different a style. A user can pan around the image rendered in each style through hand gestures, such as 406, or by moving the mobile device in a particular direction.

In particular embodiments, the context of the MVIDMR, 502a, 502b, 502c and 502d, can be transformed using the same style as the content in the MVIDMR, 504a, 504b and 504c. In other embodiments, a different style can be selected for the content and the context of the MVIDMR. Further, the content of the MVIDMR may not be stylized. But, the context may be stylized. These combinations can be changed as a function of time.

Figure 6:
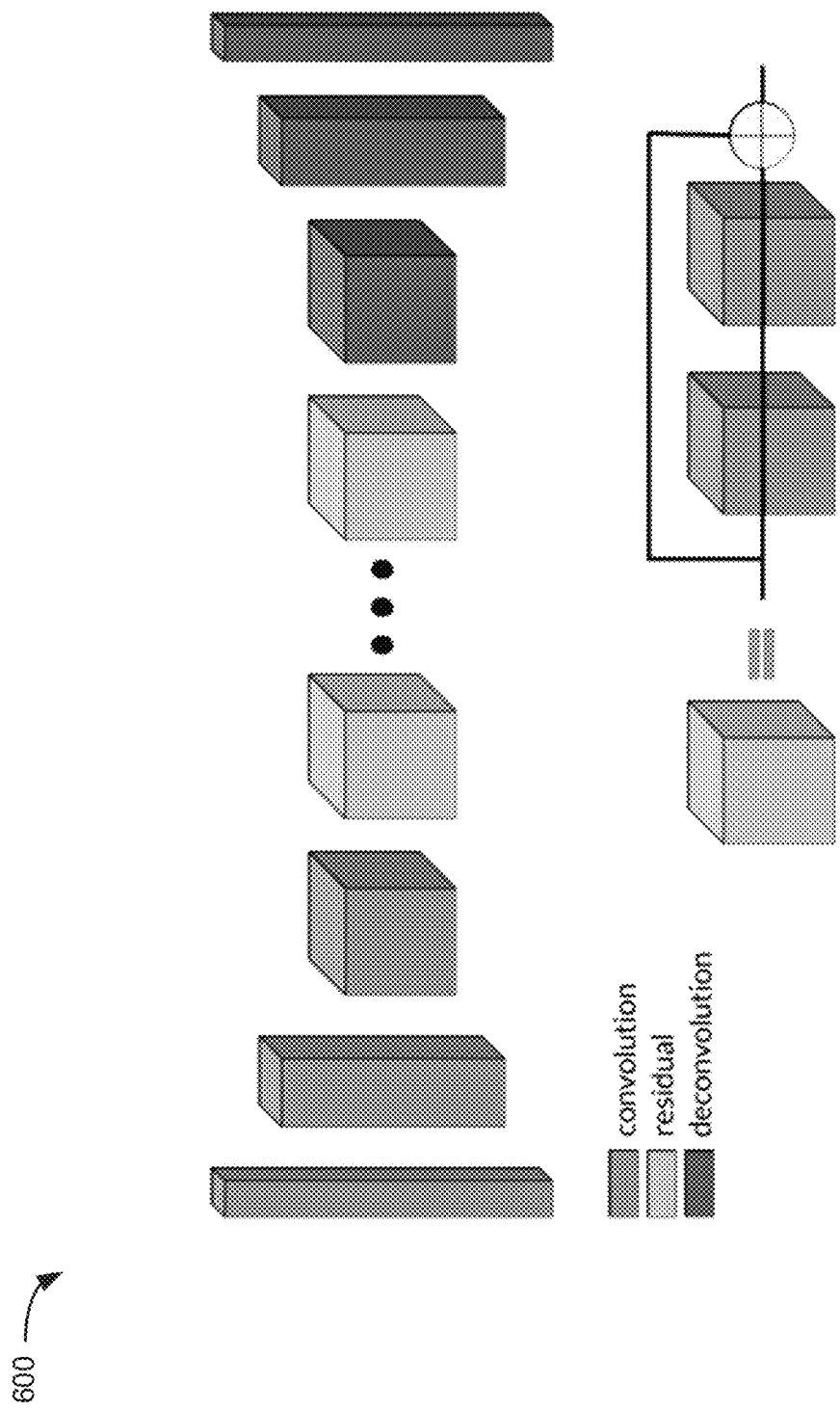
FIG. 6 illustrates an example of style transformation using a neural net.

FIG. 6 illustrates an example of style transformation of video data using a neural net. A feed forward neural network is a biologically inspired classification algorithm. It can have a (possibly large) number of simple neuron-like processing units, organized in layers. Every unit in a layer is connected with all the units in the previous layer. These connections are not all equal: each connection may have a different strength or weight. The weights on these connections encode the knowledge of a network. The units in a neural network can be referred to as nodes.

Data enters at the inputs and passes through the network, layer by layer, until it arrives at the outputs. During normal operation, that is when it acts as a classifier, there is no feedback between layers. Hence, the name feed forward neural networks is used.

A feed forward neural network can be trained using a supervised learning algorithm. The neural net is provided an input pattern and what category the pattern belongs. A pattern is presented at the inputs. The pattern can be transformed in its passage through the layers of the network until it reaches the output layer. The units in the output layer all belong to a different category.

The outputs of the network as they are now can be compared with the outputs as they ideally would have been if this pattern were correctly classified. On the basis of this comparison all the connection weights are modified. The modification of the weights is referred to as learning. In the previous examples, the neural nets are pre-trained and the weighting factors associated with the trained neural net can be downloaded to a device, such as user's mobile device.

Deeper neural networks are more difficult to train. Beyond a certain depth, traditional deeper networks start to show severe underfitting caused by optimization difficulties. In residual learning, a standard feed-forward convolution neural network is modified by adding skip connections that bypass (or shortcut) a few convolution layers at a time. Each bypass gives rise to a residual block in which the convolution layers predict a residual that is added to the block's input tensor. This process eases the training of networks that are substantially deeper than those used previously. These residual networks are easier to converge, and can gain accuracy from considerably increased depth.

In machine learning, a convolutional neural network is a type of feed-forward artificial neural network in which the connectivity pattern between its neurons is inspired by the organization of the animal visual cortex. Individual neurons of the animal cortex are arranged in such a way that they respond to overlapping regions tiling the visual field, which can mathematically be described by a convolution operation. These types of neural networks are used for image processing.

A convolution neural network (CNN) can have a number of convolutional and subsampling layers optionally followed by fully connected layers. The input to a convolutional layer can be an m×m×r image where m is the height and width of the image and r is the number of channels, e.g. an RGB image has r=3. The convolutional layer can have filters (or kernels) of size n×n×q where n is smaller than the dimension of the image and q can either be the same as the number of channels r or smaller and may vary for each kernel. The size of the filters gives rise to the locally connected structure which can each convolved with the image to produce k feature maps of size m−n+1. Each map can then subsampled typically with mean or max pooling over p×p contiguous regions.

To improve speed of the neural network the network architecture can optimized, for space and run-time. Specifically, that can be done by reducing the number of channels for each (or some) of the layers in the networks. The reduction in channels reduces the number of weights and allows for an acceptable frame per second rate when transforming a live video feed.

Figure 7:
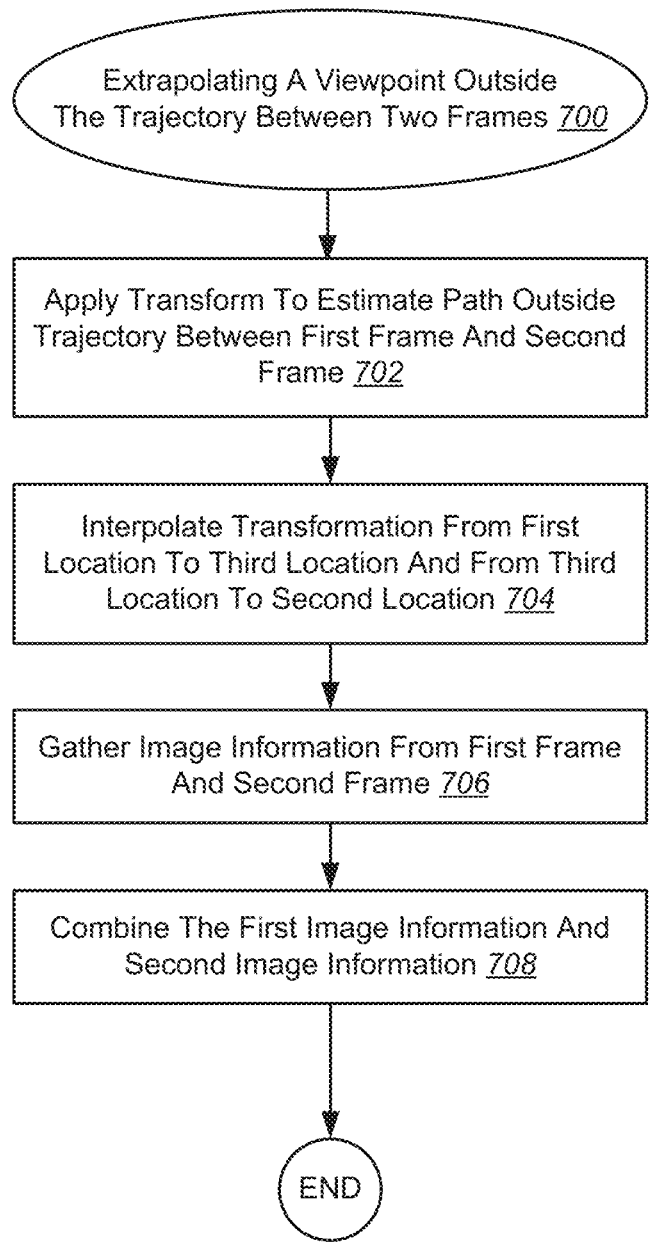
FIG. 7 illustrates an example of a process for extrapolating a viewpoint outside the trajectory between two frames.

With reference to FIG. 7, shown is an example of a process for extrapolating a viewpoint outside the trajectory between two frames. This process can be viewed as an extension to the process described with regard to FIG. 3, where viewpoints for locations outside of the trajectory between Frame A and Frame B are extrapolated by applying a transform which warps the image according the curvature and direction of the estimated path.

In the present embodiment, a transform is applied to estimate a path outside the trajectory between a first frame and a second frame at 702. The first frame includes a first image captured from a first location and the second frame includes a second image captured from a second location. In some examples, the first image and second image are associated with the same layer. Furthermore, this process can be applied to various layers and the resulting images representing the layers can be combined to generate a complete image. Next, an artificially rendered image corresponding to a third location positioned on the path is generated. The artificially rendered image is generated by first interpolating a transformation from the first location to the third location and from the third location to the second location at 704. Image information is then gathered from the first frame and the second frame at 706 by transferring first image information from the first frame to the third frame based on the interpolated transformation and second image information from the second frame to the third frame based on the interpolated transformation. Finally, the first image information and the second image information is combined at 708.

According to present embodiment, the transform can implement various features. For instance, the transform can implement features such as homography, spherical projection, and/or cylindrical projection. These features can be used alone or in conjunction with one another in applying the transform. Additional features not mentioned can also be implemented within the scope of this disclosure.

The present embodiment describes one method of extrapolating a viewpoint outside the trajectory between two frames. However, additional methods for extrapolating such viewpoints can also be implemented in other embodiments. For instance, as described above with regard to FIG. 6, another way to extrapolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Figure 8:
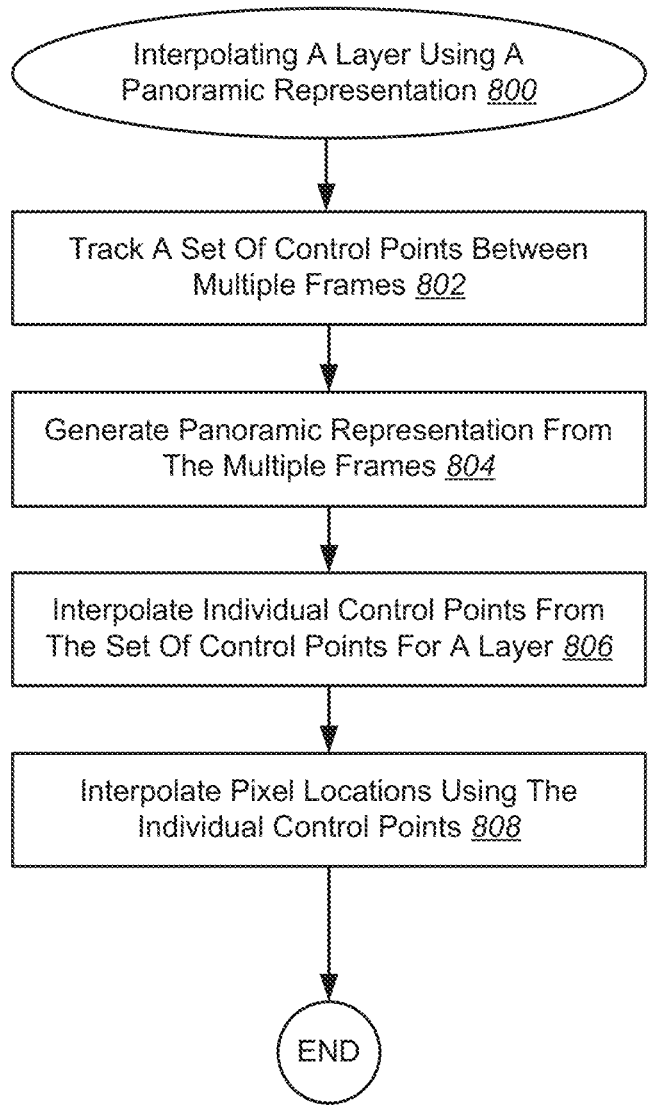
FIG. 8 illustrates an example of a process for interpolating a layer using a panoramic representation.

With reference to FIG. 8, shown is an example of a process for interpolating a layer using a panoramic representation. In this example, the span of a layer is not restricted to two frames but is constructed from multiple frames. Specifically, a panorama is created from the corresponding background regions and combined into a panoramic representation. This panorama representation is then used to interpolate the corresponding layer. Although this process is described in terms of a background layer, this process can also be extended to other types of layers. For instance, the process can be applied to layers that include objects, such as context layers.

In the present embodiment, a set of control points is tracked between multiple frames associated with the same layer at 802. In some examples, each pixel corresponds to a control point in the set of control points. In these cases, each pixel is then interpolated based on the set of control points for the artificially rendered image. Next, a panoramic representation is generated from the multiple frames at 804. Individual control points are then interpolated from the set of control points at 806 for a desired frame or layer. Pixel locations are then interpolated for this frame or layer using the individual control points at 808. From this interpolation, the artificially rendered image/layer is generated.

According to various embodiments, interpolation can be implemented using a variety of methods. For instance, interpolating the pixel locations can include interpolation using barycentric coordinates based on three or more control points. In some examples, interpolating the pixel locations includes interpolation using splines. In other examples, interpolating the pixel locations includes interpolation using finite elements. In yet other examples, interpolating the pixel locations includes using motion of a nearest control point. In addition, interpolating pixel locations using the individual control points includes using dense optical flow in some applications. Although particular examples of interpolation methods are described, any combination of these or other methods can be used.

Figure 9:
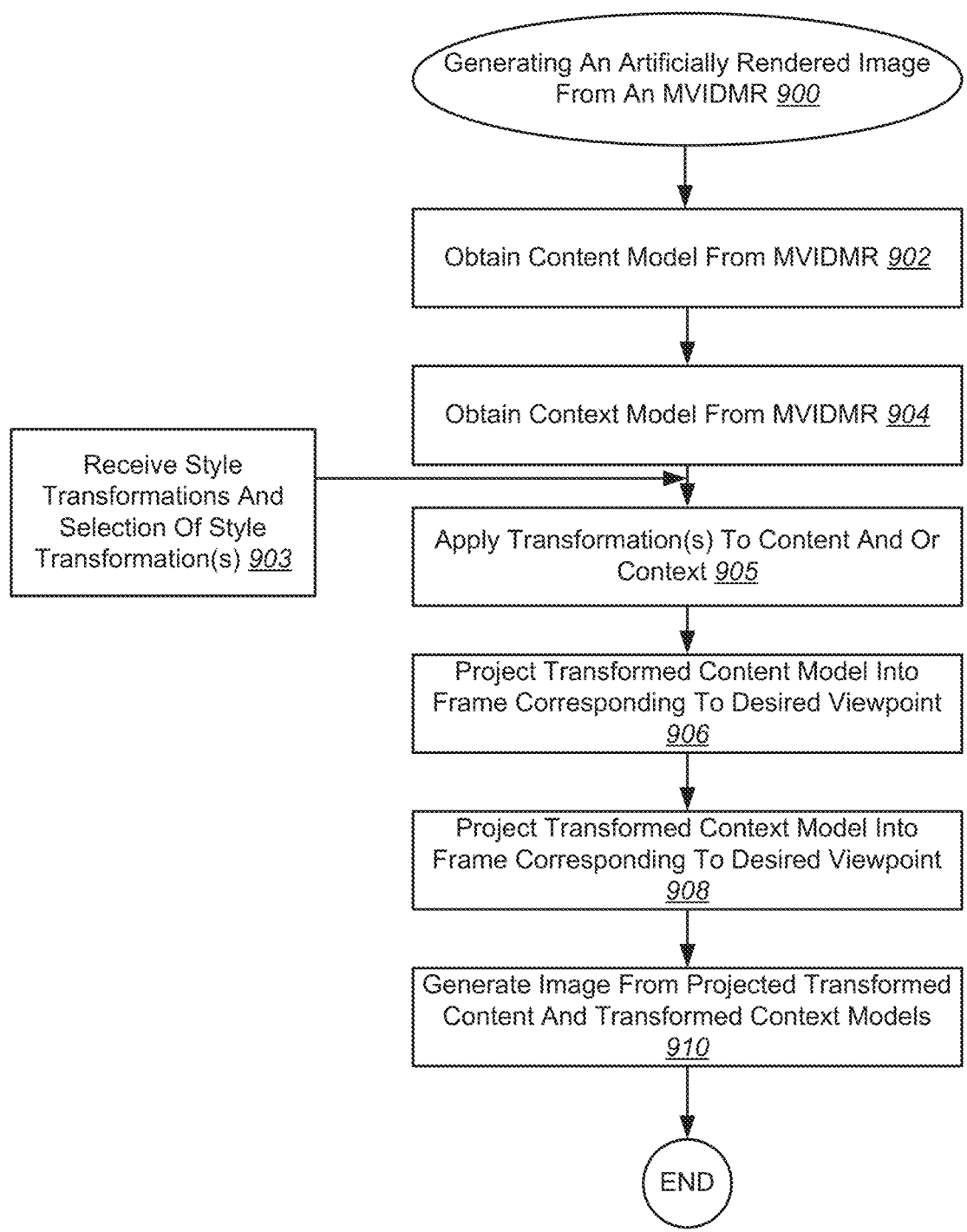
FIG. 9 illustrates an example of a process for generating an artificially rendered image from a MVIDMR including style transformations.

With reference to FIG. 9, shown is an example of a process for generating an artificially rendered image from a MVIDMR. In some examples, the MVIDMR is generated from multiple images having location information, and at least a portion of overlapping subject matter. Furthermore, according to various embodiments, the MVIDMR is generated by interpolating between the multiple images and/or extrapolating data from the multiple images. In the present example, a MVIDMR can be decomposed into one or more background panoramic representations and, in some examples, one or more foreground 3D models. An image at a specific viewpoint is then rendered by projecting the 3D model(s) and the panoramic representation(s) into a frame according to the current viewpoint and the depth and orientation of the 3D model(s).

In the present embodiment, a content model is obtained from a MVIDMR at 902. This content model is a foreground three-dimensional model including at least one object. In some examples, obtaining the content model from the MVIDMR includes extracting the content model from the MVIDMR. At 904, a context model is obtained from the MVIDMR. This context model is a background panoramic representation including scenery surrounding any objects in the content model. In some examples, obtaining the context model from the MVIDMR includes extracting the context model from the MVIDMR.

In 903, style transformations associated with weighting factors in a neural network can be received for one or more styles. Then, a selection of one of more of the styles can be selected. In 905, the style transformation can be applied to content and/or context in a MVIDMR.

Next, the transformed content model is projected into a frame corresponding to a desired viewpoint at 906. The context model is also projected into the frame corresponding to the desired viewpoint at 908. According to various embodiments, the content model and context model are projected according to the depth and orientation of the content model. The artificially rendered image at the desired viewpoint is generated from a combination of the projected content and context at 910.

Figure 10:
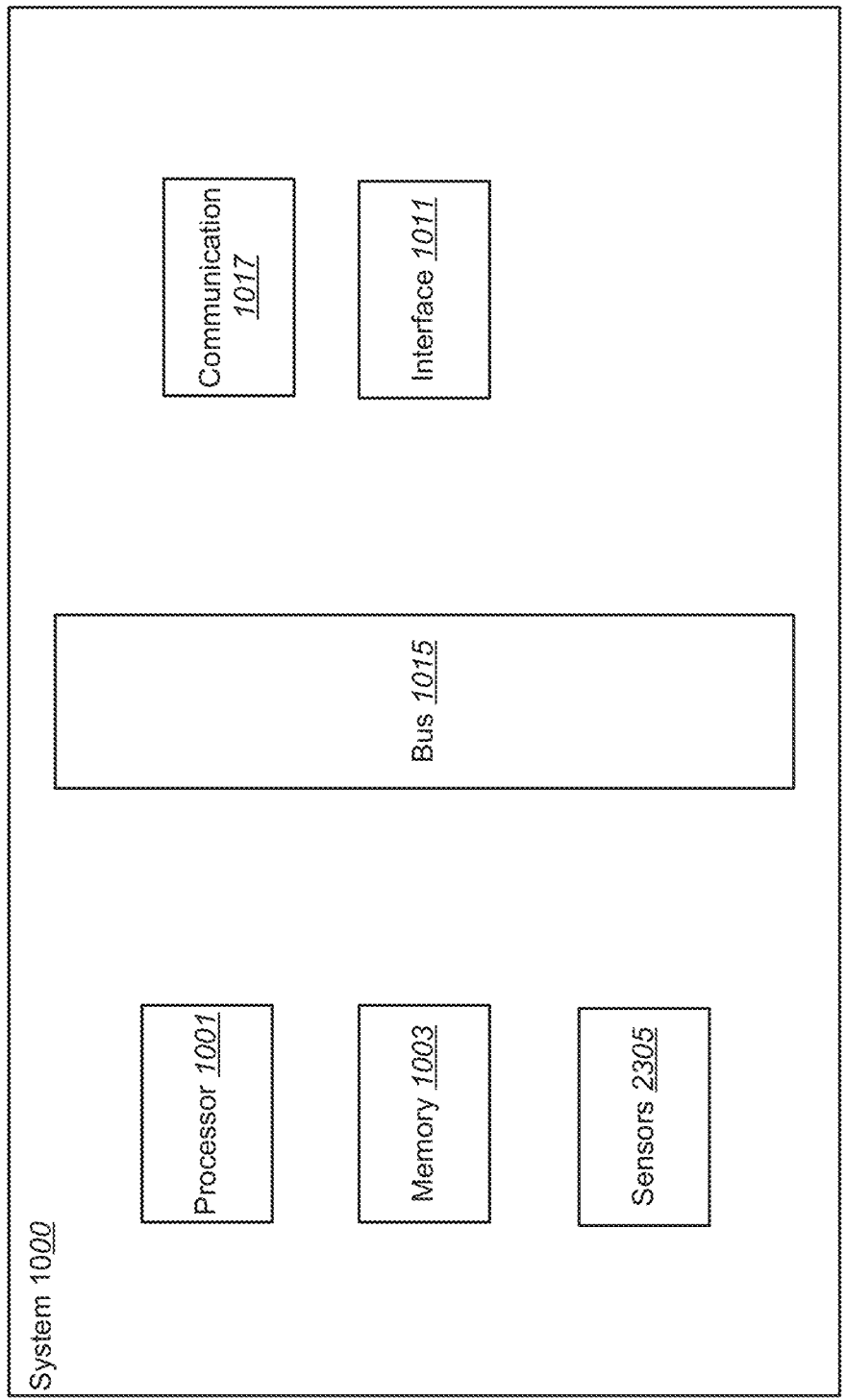
FIG. 10 illustrates a particular example of a computer system that can be used with various embodiments of the present invention.

With reference to FIG. 10, shown is a particular example of a computer system that can be used to implement particular examples of the present invention. For instance, the computer system 1000 can be used to provide MVIDMRs according to various embodiments described above. According to particular example embodiments, a system 1000 suitable for implementing particular embodiments of the present invention includes a processor 1001, a memory 1003, an interface 1011, and a bus 1015 (e.g., a PCI bus).

The system 1000 can include one or more sensors 1005, such as light sensors, accelerometers, gyroscopes, multi-axis magnetometers, microphones, cameras including stereoscopic capabilities or structured light cameras. Structured light cameras can help determine distances to objects. A Kinect™ sensor using a structured light sensor. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

As described above, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data.

One advantage of tracking objects in the manner described above in the 2-D image space is that a 3-D reconstruction of an object or objects appearing in an image don't have to be performed. The 3-D reconstruction step can be referred to as "structure from motion (SFM)" in the computer vision community and "simultaneous localization and mapping (SLAM)" in the robotics community. The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

The interface 1011 may include separate input and output interfaces, or may be a unified interface supporting both operations. Examples of input and output interfaces can include displays, audio devices, cameras, touch screens, buttons and microphones. When acting under the control of appropriate software or firmware, the processor 1001 is responsible for such tasks such as optimization. Various specially configured devices can also be used in place of a processor 1001 or in addition to processor 1001, such as graphical processor units (GPUs). The complete implementation can also be done in custom hardware. The interface 1011 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1000 uses memory 1003 to store data and program instructions and maintained a local side cache. The program instructions may control the operation of an operating system and/or one or more applications, for example. The memory or memories may also be configured to store received metadata and batch requested metadata.

In FIG. 10, the system 1000 can be integrated into a single device with a common housing. For example, system 1000 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 1000 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
receiving a selection of a first one of a plurality of styles on a mobile device;
receiving, on the mobile device, a plurality of sets of neural network weighting factors from a remote computing device via a network interface, the neural network weighting factors implemented into a first neural network located on the mobile device, wherein the neural network weighting factors are pre-trained on the remote computing device to convert video images to the first style;
receiving a live feed of video data from a camera system on the mobile device wherein a position and orientation of the camera system is changing as a function of time;
applying the first neural network, including the neural network weighting factors, to frames in the video data to transform the frames to the first style;
outputting the transformed video data to a display of the mobile device in real-time as the position and the orientation of the camera system is changing such that the transformed video data output to the display appears consistent with a current position and a current orientation of the camera system; and
recording the video data from the live feed to a memory module.

2. The method of claim 1, further comprising:
generating, based upon a second style, a second neural network including second weighting factors;

applying the second neural network to second frames in the video data to transform the second frames to the second style associated with the second neural network; and outputting the second frames to the display in real-time.

3. The method of claim 1, further comprising, after the transformed video data is output to the display, receiving a request to record the video data from the live feed.

4. The method of claim 3, further comprising storing information about the first style to the memory module.

5. The method of claim 4, further comprising:
stopping the recording;
retrieving the recorded video data and the first style from the memory module;
applying the first neural network to first frames from the recorded video data to transform the first frames to the first style; and
outputting the transformed video data to the display of the mobile device.

6. The method of claim 1, further comprising:
generating composite frames including both video data and the transformed video data; and
outputting the composite frames to the display.

7. The method of claim 1, further comprising:
identifying an object in the video data, wherein each frame in the video data includes a respective first portion that includes the object and a respective second portion that does not include the object, and wherein applying the first neural network to frames in the video data involves applying the first neural network to the first portion of each frame but not the second portion of each frame.

8. The method of claim 7, wherein the object is a person.

9. The method of claim 1, further comprising:
retrieving a multi-view interactive digital media representation (MVIDMR) from a memory on the mobile device, wherein the MVIDMR includes a plurality of images; and
generating second frames that each include one of the plurality of images from the MVIDMR inserted into one of the frames of the video data.

10. The method of claim 9, further comprising:
applying the first neural network to the second frames in the video data to transform the second frames to the first style; and
outputting the transformed second frames to the display of the mobile device in real-time as the position and the orientation of the camera system is changing, such that the transformed second frames output to the display appear consistent with the current position and the current orientation of the camera system, wherein an object associated with the MVIDMR appears to change in a first orientation in real-time on the display.

11. The method of claim 9, further comprising:
applying the first neural network to the one of the plurality of images from the MVIDMR inserted into each of the second frames in the video data to transform a portion of the second frames associated with the MVIDMR to the first style; and
outputting the transformed second frames to the display of the mobile device in real-time as the position and the orientation of the camera system is changing, such that transformed second frames output to the display appears consistent with the current position and the current orientation of the camera system, wherein an object associated with the MVIDMR appears to change in a first orientation in real-time on the display.

12. The method of claim 9, further comprising:
applying the first neural network to a portion of the second frames associated with the video data to transform the portion of the second frames associated with the video data to the first style associated with the first neural network; and
outputting the transformed second frames to the display of the mobile device in real-time as the position and the orientation of the camera system is changing, such that transformed second frames output to the display appears consistent with the current position and the current orientation of the camera system, wherein an object associated with the MVIDMR appears to change in a first orientation in real-time on the display.

13. The method of claim 9, further comprising:
applying the first neural network to the one of the plurality of images from the MVIDMR inserted into each of the second frames in the video data to transform a portion of the second frames associated with the MVIDMR to the first style;
applying the first neural network to the portion of the second frames associated with the video data to transform the portion of the second frames associated with the video data to the first style associated with the first neural network; and
outputting the transformed second frames to the display of the mobile device in real-time as the position and the orientation of the camera system is changing, such that transformed second frames output to the display appears consistent with the current position and the current orientation of the camera system, wherein an object associated with the MVIDMR appears to change in a first orientation in real-time on the display.

14. The method of claim 1, further comprising;
receiving a stream of video data from a remote device;
applying the first neural network to first frames in the streamed video data to transform the first frames to the first style; and
outputting the transformed streamed video data to a display of the mobile device.

* * * * *